United States Patent
Nakamura et al.

(10) Patent No.: US 7,074,855 B2
(45) Date of Patent: Jul. 11, 2006

(54) THERMOPLASTIC ELASTOMER COMPOSITION

(75) Inventors: Eiji Nakamura, Tsukuba (JP); Haruhisa Masuda, Tsukuba (JP); Shigeru Sasaki, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 91 days.

(21) Appl. No.: 10/476,284

(22) PCT Filed: May 1, 2002

(86) PCT No.: PCT/JP02/04354
§ 371 (c)(1),
(2), (4) Date: Oct. 29, 2003

(87) PCT Pub. No.: WO02/090433
PCT Pub. Date: Nov. 14, 2002

(65) Prior Publication Data
US 2004/0132907 A1    Jul. 8, 2004

(30) Foreign Application Priority Data
May 1, 2001    (JP)    .............................. 2001-133898

(51) Int. Cl.
*C08L 53/02*    (2006.01)

(52) U.S. Cl. .............................. 525/93; 525/96; 525/98
(58) Field of Classification Search ................ 525/271, 525/99, 314, 316, 331.9, 332.2, 93, 96, 98
See application file for complete search history.

(56) References Cited

U.S. PATENT DOCUMENTS

| | | | | |
|---|---|---|---|---|
| 4,600,749 A * | 7/1986 | Minekawa et al. | .......... | 525/314 |
| 4,687,815 A * | 8/1987 | Wong | .......... | 525/271 |
| 4,968,754 A * | 11/1990 | Wong | .......... | 525/285 |
| 6,723,776 B1 * | 4/2004 | Sakaki et al. | .......... | 524/474 |

FOREIGN PATENT DOCUMENTS

| | | |
|---|---|---|
| JP | 59-131613 | 7/1984 |
| JP | 8-225713 | 9/1996 |
| JP | 11-293083 | 10/1999 |
| JP | 2000-109640 | 4/2000 |
| JP | 2000-159943 | 6/2000 |
| JP | 2000-169666 | 6/2000 |
| WO | 95/00566 | 1/1995 |

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

A thermoplastic elastomer composition comprising (I) 100 parts by weight of at least one block copolymer formed by addition polymerization which is selected among block copolymers which comprise a polymer block (A) consisting of aromatic vinyl units and a polymer block (B) consisting of conjugated diene compound units and which have been crosslinked in the polymer block (A) preferably with a structural unit derived from a ($C_1$–$C_8$ alkyl)styrene and/or functional group and among products of hydrogenation of the copolymers, (II) 10 to 300 parts by weight of a polyolefin, and (III) 0 to 300 parts by weight of a softener (III) for rubbers; and a process for producing the composition. The composition has excellent strain recovery at high temperatures and satisfactory moldability, is flexible, and has satisfactory rubber properties. It is effectively useable in various applications.

13 Claims, 1 Drawing Sheet

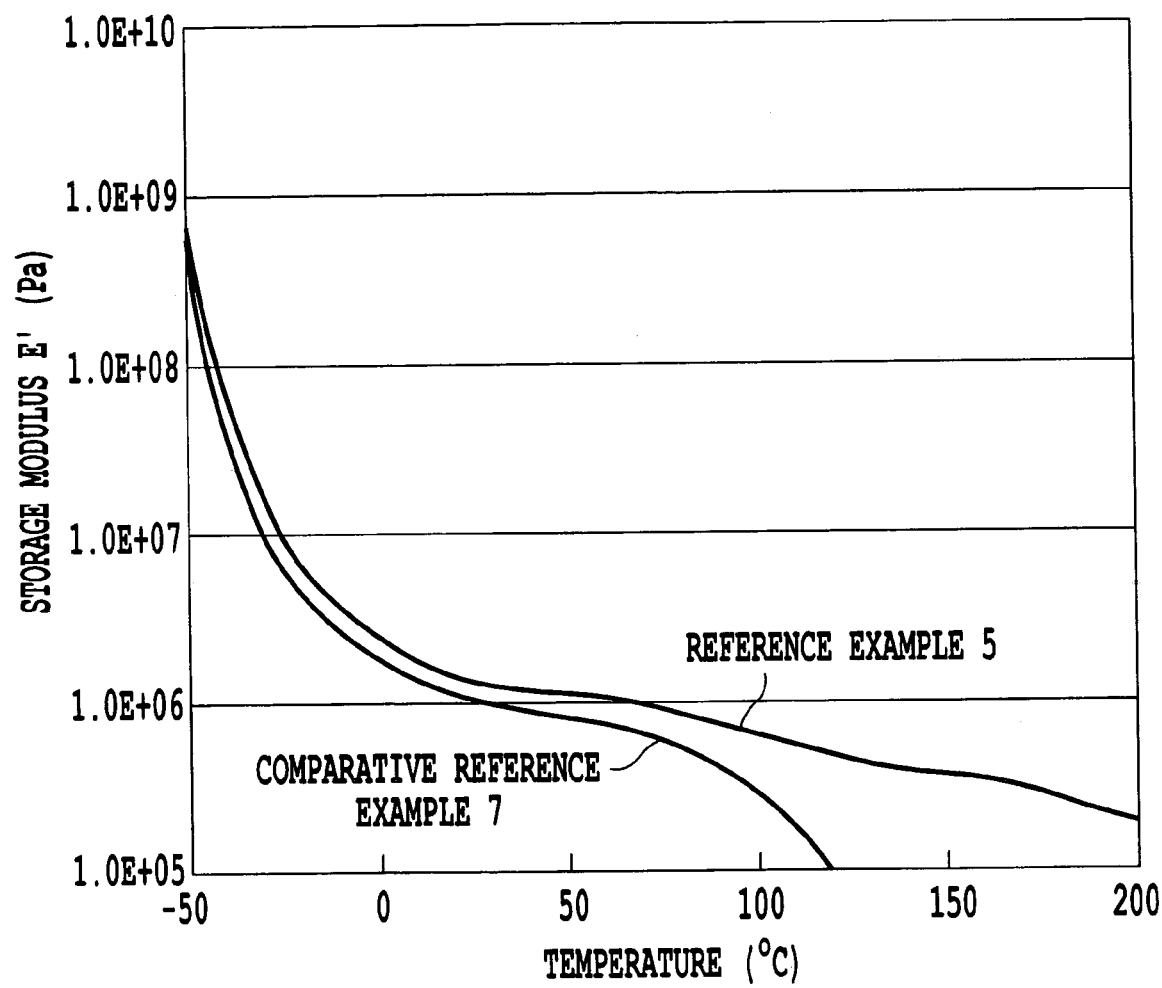

THERMOPLASTIC ELASTOMER COMPOSITION

TECHNICAL FIELD

The present invention relates to a thermoplastic elastomer composition comprising a specific crosslinked addition block copolymer, a polyolefin, and, if any, a rubber softener, a production process therefor, a molded article comprising the thermoplastic elastomer composition, and the specific crosslinked addition block copolymer constituting the thermoplastic elastomer composition. The thermoplastic elastomer composition of the present invention has excellent strain recovery and satisfactory moldability, is flexible, and has satisfactory rubber properties. It is very effectively useable in automobile parts, civil engineering and construction applications, home-appliance parts, sporting goods, sundry goods, stationery, and other various molded articles and other wide-ranging applications.

BACKGROUND ART

Thermoplastic elastomers are soft materials having rubber elasticity, do not require a vulcanization process and can be molded and recycled as in thermoplastic resins. They have been frequently used in the fields of, for example, automobile parts, home-appliance parts, wire coating, medical parts, sundry goods, and footgear. Among these thermoplastic elastomers, certain proposals have been made on elastomer compositions using a hydrogenated product of a block copolymer (hereinafter may briefly referred to as "hydrogenated block copolymer") having a polymer block comprising an aromatic vinyl compound and a polymer block comprising a conjugated diene compound. For example, Japanese Unexamined Patent Application Publication (JP-A) No. 59-131613, JP-A No. 08-225713, JP-A No. 2000-109640, and PCT International Publication No. WO 95/00566 propose techniques in which an elastomer composition comprising a hydrogenated block copolymer with, for example, a hydrocarbon oil and an olefin polymer is crosslinked using a crosslinking agent such as an organic peroxide and a coagent to thereby improve rubber elasticity (compression set) at high temperatures of the resulting elastomer composition.

The elastomer composition comprising the hydrogenated block copolymer can be recycled, which is a feature of such thermoplastic elastomers. However, the elastomer composition is crosslinked only in its soft segment comprising the conjugated diene compound block of the hydrogenated block copolymer, therefore has insufficient rubber elasticity at 100° C. or higher and does not achieve a low compression set level at high temperatures. Such a low compression set at high temperatures can be achieved by the use of a vulcanized rubber. This is because when the temperature of a test for determining the compression set reaches the glass transition point (Tg) of the vinyl aromatic block or higher, the polymer block comprising the vinyl aromatic compound has decreased constraint force, and a hard segment including the polymer block comprising the aromatic vinyl compound becomes less contributory to rubber elasticity.

Accordingly, an object of the present invention is to provide a thermoplastic elastomer composition which contains an addition block copolymer and a polyolefin, has excellent strain recovery at high temperatures, is flexible and has satisfactory rubber properties, a production process therefor, a molded article comprising the thermoplastic elastomer composition, and a specific addition block copolymer constituting the thermoplastic elastomer composition.

DISCLOSURE OF INVENTION

After intensive investigations to solve the above problems, the present inventors have found that a thermoplastic elastomer composition has excellent strain recovery at high temperatures and satisfactory rubber properties by using a block copolymer including at least one aromatic vinyl compound polymer block and at least one conjugated diene compound polymer block and having a specific crosslinked structure, in which the block copolymer is crosslinked at least in the polymer block comprising the aromatic vinyl compound and constituting a hard segment, and by incorporating a specific amount of a polyolefin and, if desired, a rubber softener to the block copolymer having such a specific crosslinked structure to yield the thermoplastic elastomer composition.

The present inventors have also found that the thermoplastic elastomer composition having excellent strain recovery at high temperatures and satisfactory rubber properties can be smoothly produced by mixing a block copolymer with a polyolefin, a crosslinking agent, and, if any, a rubber softener, and subjecting the resulting mixture to dynamic vulcanization under melting conditions, which block copolymer comprises an aromatic vinyl compound polymer block and a conjugated diene compound polymer block and has at least one of an alkylstyrene-derived structural unit having at least one alkyl group containing 1 to 8 carbon atoms combined with its benzene ring and a functional group in the aromatic vinyl compound polymer block.

After further investigations on the thermoplastic elastomer composition obtained by dynamic vulcanization, the present inventors have found that a novel addition block copolymer which is crosslinked in a polymer block comprising an aromatic vinyl compound and constituting a hard segment of the block copolymer is formed in the thermoplastic elastomer composition, and that the specific crosslinked structure in the hard segment of the block copolymer imparts excellent strain recovery at high temperatures to the thermoplastic elastomer composition comprising the block copolymer and to molded articles comprising the thermoplastic elastomer composition. The present invention has been accomplished based on these findings.

Specifically, the present invention provides:

(1) a thermoplastic elastomer composition comprising:
  100 parts by weight of at least one addition block copolymer (I) selected from among block copolymers and hydrogenated products thereof, the block copolymers each having at least one polymer block (A) comprising aromatic vinyl compound units, and at least one polymer block (B) comprising conjugated diene compound units, and the addition block copolymers being crosslinked at least in the polymer block (A);
  10 to 300 parts by weight of a polyolefin (II); and
  0 to 300 parts by weight of a rubber softener (III).

The present invention also provides:

(2) the thermoplastic elastomer composition according to (1), in which the addition block copolymer (I) has at least one of an alkylstyrene-derived structural unit (a) and a functional group (b) in the polymer block (A), which alkylstyrene-derived structural unit (a) has at least one alkyl group containing from 1 to 8 carbon atoms and being combined with its benzene ring, and the addition block copolymer (I) is crosslinked at least in the polymer block (A) through the at least one of the alkylstyrene-derived structural unit (a) and the functional group (b);

(3) the thermoplastic elastomer composition according to (1), in which the addition block copolymer (I) has an alkylstyrene-derived structural unit (a) in the polymer block (A) in an amount of 1% by weight or more based on the total weight of the polymer block (A), which alkylstyrene-derived structural unit (a) has at least one alkyl group containing from 1 to 8 carbon atoms and being combined with its benzene ring, and the addition block copolymer (I) is crosslinked at least in the polymer block (A) through the alkylstyrene-derived structural unit (a);

(4) the thermoplastic elastomer composition according to (1), in which the addition block copolymer (I) has a functional group (b) in the polymer block (A) in an amount of 1.5 groups or more per molecule of the addition block copolymer (I), and the addition block copolymer (I) is crosslinked at least in the polymer block (A) through the functional group (b);

(5) the thermoplastic elastomer composition according to (1), in which the alkylstyrene-derived structural unit (a) is a p-alkylstyrene unit containing from 1 to 8 carbon atoms in its alkyl group, and the functional group (b) is at least one functional group selected from among functional groups having active hydrogen atoms, functional groups having nitrogen atoms, functional groups having carbonyl groups, functional groups having thiocarbonyl groups, epoxy groups, and thioepoxy groups, in the polymer block (A) of the addition block copolymer (I);

(6) the thermoplastic elastomer composition according to (5), in which the alkylstyrene-derived structural unit (a) is a p-methylstyrene, and the functional group (b) is a hydroxyl group; and (7) the thermoplastic elastomer composition according to (1), which has a morphological structure in which at least the polyolefin (II) forms a continuous phase.

In another aspect, the present invention provides:

(8) a process for producing the thermoplastic elastomer composition of (1), the process comprising the step of dynamic vulcanization of a mixture under melting conditions, the mixture comprising:

100 parts by weight of at least one addition block copolymer ($I_O$) selected from among block copolymers and hydrogenated products thereof, the block copolymers each having at least one polymer block (A) comprising aromatic vinyl compound units; and at least one polymer block (B) comprising conjugated diene compound units, the polymer block (A) having at least one of an alkylstyrene-derived structural unit (a) and a functional group (b), which alkylstyrene-derived structural unit (a) has at least one alkyl group containing from 1 to 8 carbon atoms and being combined with its benzene ring;

10 to 300 parts by weight of a polyolefin (II);

0 to 300 parts by weight of a rubber softener (III); and 0.01 to 20 parts by weight of a crosslinking agent (IV).

The present invention also provides:

(9) the process for producing the thermoplastic elastomer composition according to (8), in which the addition block copolymer ($I_O$) comprises the alkylstyrene-derived structural unit (a) in the polymer block (A) in an amount of 1% by weight or more based on the total weight of the polymer block (A), which alkylstyrene-derived structural unit (a) has at least one alkyl group containing from 1 to 8 carbon atoms and being combined with its benzene ring;

(10) the process for producing the thermoplastic elastomer composition according to (8), in which the addition block copolymer ($I_O$) comprises the functional group (b) in the polymer block (A) in an amount of 1.5 groups or more per molecule of the addition block copolymer (I);

(11) the process for producing the thermoplastic elastomer composition according to (8), in which the alkylstyrene-derived structural unit (a) is a p-alkylstyrene unit containing from 1 to 8 carbon atoms in its alkyl group, and the functional group (b) is at least one functional group selected from among functional groups having active hydrogen atoms, functional groups having nitrogen atoms, functional groups having carbonyl groups, functional groups having thiocarbonyl groups, epoxy groups, and thioepoxy groups, in the polymer block (A) of the addition block copolymer ($I_O$); and

(12) the process for producing the thermoplastic elastomer composition according to (8), in which the alkylstyrene-derived structural unit (b) is a p-methylstyrene unit, and the functional group (b) is a hydroxyl group in the polymer block (A) of the addition block copolymer ($I_O$).

The present invention provides, in a further aspect:

(13) a molded article comprising the thermoplastic elastomer composition of (1).

In addition and advantageously, the present invention provides:

(14) a block copolymer or its hydrogenated product, the block copolymer having at least one polymer block (A) comprising aromatic vinyl compound units; and at least one polymer block (B) comprising conjugated diene compound units, wherein the block copolymer is crosslinked at least in the polymer block (A).

The present invention also provides:

(15) the block copolymer or its hydrogenated product according to (14), in which the addition block copolymer (I) has at least one of an alkylstyrene-derived structural unit (a) and a functional group (b) in the polymer block (A), which alkylstyrene-derived structural unit (a) has at least one alkyl group containing from 1 to 8 carbon atoms and being combined with its benzene ring, and the block copolymer is crosslinked at least in the polymer block (A) through the at least one of the alkylstyrene-derived structural unit (a) and the functional group (b).

BRIEF DESCRIPTION OF THE DRAWING

FIG. 1 is a graph showing measured dynamic viscoelasticity of thermoplastic elastomer compositions obtained according to Reference Example 5 and Comparative Reference Example 7.

BEST MODE FOR CARRYING OUT THE INVENTION

The present invention will now be illustrated in further detail.

The addition block copolymer (I) serving as a base component of the thermoplastic elastomer composition of the present invention is a block copolymer having at least one polymer block (A) comprising aromatic vinyl compound units and at least one polymer block (B) comprising conjugated diene compound units and is crosslinked at least in the polymer block (A) constituting a hard segment.

The addition block copolymer (I) may be crosslinked not in the polymer block (B) but only in the polymer block (A) or may be crosslinked both in the polymer block (A) and in the polymer block (B). To hold the rubber softener (III) satisfactorily and to suppress bleeding of the rubber softener (III), it is preferred that the addition block copolymer (I) is crosslinked not in the polymer block (B) but only in the polymer block (A).

The addition block copolymer (I) which is crosslinked at least in the polymer block (A) can be advantageously obtained by introducing at least one of an alkylstyrene-derived structural unit (a) (herein after referred to as "($C_1$–$C_8$ alkyl)styrene-derived structural unit (a)") and a functional group (b) into the polymer block (A), and forming a crosslinked structure in the polymer block (A) through the ($C_1$–$C_8$ alkyl)styrene-derived structural unit (a) and/or the functional group (b), which alkylstyrene-derived structural unit (a) has at least one alkyl group containing from 1 to 8 carbon atoms and being combined with its benzene ring.

In the addition block copolymer (I), the polymer block (A) comprising aromatic vinyl compound units constitutes a hard segment, and the polymer block (B) constitutes a soft segment. In a preferred addition block copolymer (I) for use in the present invention, the polymer block (A) constituting the hard segment has at least one of the ($C_1$–$C_8$ alkyl) styrene-derived structural unit (a) and the functional group (b) and is crosslinked through the at least one of the ($C_1$–$C_8$ alkyl)styrene-derived structural unit (a) and the functional group (b). The resulting thermoplastic elastomer composition of the present invention comprising this type of addition block copolymer (I) has excellent strain recovery at high temperatures and satisfactory rubber properties.

It is acceptable that the addition block copolymer (I) has at least one of the ($C_1$–$C_8$ alkyl)styrene-derived structural unit (a) and the functional group (b) not in the polymer block (B) but only in the polymer block (A), and the addition block copolymer (I) is crosslinked only in the polymer block (A). Alternatively, it is also acceptable that the addition block copolymer (I) has at least one of the ($C_1$–$C_8$ alkyl)styrene-derived structural unit (a) and the functional group (b) in the polymer block (A) and has the functional group (b) in the polymer block (B), and the addition block copolymer (I) is crosslinked both in the polymer block (A) and in the polymer block (B). When the addition block copolymer (I) is crosslinked both in the polymer block (A) and in the polymer block (B), the polymer block (B) may be crosslinked through another moiety than the ($C_1$–$C_8$ alkyl) styrene-derived structural unit (a) and the functional group (b).

The polymer block (A) having at least one of the ($C_1$–$C_8$ alkyl)styrene-derived structural unit (a) and the functional group (b) may have the ($C_1$–$C_8$ alkyl)styrene-derived structural unit (a) and/or the functional group (b) at its end(s) or both at its end(s) and at some midpoint in its molecular chain. Thus, the polymer block (A) may be crosslinked at its end(s), crosslinked at some midpoint in its molecular chain or crosslinked both at its end(s) and at some midpoint in its molecular chain.

When the addition block copolymer (I) is a diblock copolymer (A-B) having one polymer block (A), a triblock copolymer (B-A-B) having one polymer block (A), or a hydrogenated product thereof, at least one of the ($C_1$–$C_8$ alkyl)styrene-derived structural unit (a) and the functional group (b) is present in the one polymer block (A) to form a crosslink therein.

When the addition block copolymer (I) is a triblock, tetrablock, or higher multiblock copolymer having two or more polymer blocks (A) or a hydrogenated product thereof, at least one of the ($C_1$–$C_8$ alkyl)styrene-derived structural unit (a) and the functional group (b) may be present in only one of the two or more polymer blocks (A) to form a crosslinked structure therein or may be present in two or more of or all of the polymer blocks (A) to form crosslinked structures in the plural polymer blocks (A).

When the addition block copolymer (I) is a diblock copolymer (A-B) having one polymer block (A), a triblock copolymer (B-A-B) having one polymer-block (A), or a hydrogenated product thereof, the addition block copolymer (I) is a diblock copolymer represented by $A_1$-B or a triblock copolymer represented by B-$A_1$-B which is crosslinked at least in the polymer block $A_1$, or a hydrogenated product thereof, wherein $A_0$ is a polymer block (A) having neither ($C_1$–$C_8$ alkyl)styrene-derived structural unit (a) nor functional group (b); $A_1$ is a polymer block (A) having at least one of the ($C_1$–$C_8$ alkyl)styrene-derived structural unit (a) and the functional group (b); and B is a polymer block (B). In this case, it is preferred that the polymer block (B) is also crosslinked in the addition block copolymer (I) for better rubber elasticity.

When the addition block copolymer (I) is a triblock, a tetrablock, or a higher multiblock copolymer having two or more polymer blocks (A) or a hydrogenated product thereof, it can be any of multiblock copolymers and/or hydrogenated products thereof represented by, for example, $A_1$-B-$A_0$, $A_1$-B-$A_1$, $A_1$-B-$A_0$-B, $A_1$-B-$A_1$-B, $A_1$-$A_0$-B-$A_0$-$A_1$, $A_0$-$A_1$-B-$A_1$-$A_0$, $A_1$-B-$A_0$-B-$A_1$, ($A_1$-B)j wherein j is an integer of 3 or more, ($A_1$-B)k-$A_1$ wherein k is an integer of 2 or more, (B-$A_1$-)m-B wherein m is an integer of 2 or more, and ($A_1$-B)nX wherein n is an integer of 2 or more, and X is a residue of a coupling agent, each of which is crosslinked at least in the block $A_1$.

Among them, the addition block copolymer (I) is preferably a hydrogenated product of a triblock copolymer represented by $A_1$-B-$A_1$ and/or a hydrogenated product of a pentablock copolymer represented by $A_1$-$A_0$-B-$A_0$-$A_1$ which is crosslinked at least in the block $A_1$. The resulting thermoplastic elastomer composition of the present invention comprising this type of addition block copolymer (I) has further excellent strain recovery at high temperatures.

More preferably, the addition block copolymer (I) is a crosslinked hydrogenated product of the triblock copolymer represented by $A_1$-B-$A_1$ which is crosslinked at least in the block $A_1$. In this case, the physical properties can be further effectively improved by introducing crosslinks, and the resulting thermoplastic elastomer composition can have further excellent strain recovery at high temperatures and rubber properties.

The alkylstyrene constituting the ($C_1$–$C_8$ alkyl)styrene-derived structural unit (a) in the polymer block (A) includes, for example, o-alkylstyrene, m-alkylstyrene, p-alkylstyrene, 2,4-dialkylstyrene, 3,5-dialkylstyrene, and 2,4,6-trialkylstyrene, each containing 1 to 8 carbon atoms in the alkyl group, as well as halogenated alkylstyrenes corresponding to the aforementioned alkylstyrenes except with halogen atoms replacing one or more of hydrogen atoms in the alkyl group. Examples of such alkylstyrene derivatives constituting the ($C_1$–$C_8$ alkyl)styrene-derived structural unit include o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene, and p-dichloromethylstyrene.

The polymer block (A) may have one or more units selected from the alkylstyrenes and halogenated alkylstyrenes as the ($C_1$–$C_8$ alkyl)styrene-derived structural unit (a).

Among them, p-methylstyrene unit has excellent reactivity with the crosslinking agent (IV) such as bismaleimide compounds and organic peroxides, can reliably introduce a crosslinked structure into the polymer block (A) and is thereby preferred as the ($C_1$–$C_8$ alkyl)styrene-derived structural unit (a).

If the alkyl group combined with the benzene ring of an alkylstyrene-derived structural unit has 9 or more carbon atoms, the resulting structural unit may have decreased reactivity with the crosslinking agent (IV) and becomes less contributory to the formation of a crosslinked structure.

When the addition block copolymer (I) has the ($C_1$–$C_8$ alkyl)styrene-derived structural unit (a) in the polymer block (A) and is crosslinked therethrough, the content of the ($C_1$–$C_8$ alkyl)styrene-derived structural unit (a) in the polymer block (A) can vary depending on, for example, the number of combined blocks in the addition block copolymer (I), the molecular weight of the addition block copolymer, and whether the polymer block (A) has only the ($C_1$–$C_8$ alkyl)styrene-derived structural unit (a) or has both the ($C_1$–$C_8$ alkyl)styrene-derived structural unit (a) and the functional group (b).

When the addition block copolymer (I) is an addition block copolymer, or its hydrogenated product, which has not the functional group (b) but the ($C_1$–$C_8$ alkyl)styrene-derived structural unit (a) alone in the polymer block (A) and is crosslinked in the ($C_1$–$C_8$ alkyl)styrene-derived structural unit (a) (hereinafter may be referred to as "addition block copolymer (Ia)"), the content of the ($C_1$–$C_8$ alkyl)styrene-derived structural unit (a) in the polymer block (A) is preferably 1% by weight or more, more preferably 5% by weight or more, and further preferably 10% by weight or more based on the weight of the polymer block (A) constituting the addition block copolymer (Ia). When the addition block copolymer (Ia) has two or more polymer blocks (A), the term "weight of the polymer block (A)" means the total weight of the two or more polymer blocks (A). All the units constituting the polymer block (A) may comprise the ($C_1$–$C_8$ alkyl)styrene-derived structural units (a). In such an addition block copolymer (Ia) having the ($C_1$–$C_8$ alkyl)styrene-derived structural unit (a) alone in the polymer block (A), if the content of the ($C_1$–$C_8$ alkyl)styrene-derived structural unit (a) is less than 1% by weight based on the weight of the polymer block (A), crosslinks may hardly be formed in the polymer block (A), and the resulting thermoplastic elastomer composition comprising the addition block copolymer may often have insufficient strain recovery at high temperatures.

Examples of the functional group (b) (functional group before crosslinking) in the polymer block (A) of the addition block copolymer (I) include functional groups having active hydrogen atoms, such as functional groups represented by following formulae: —OH, —SH, —$NH_2$, —NHR, —$CONH_2$, —CONHR, —CONH—, —$SO_3H$, —$SO_2H$, and —SOH, wherein R is a hydrocarbon group; functional groups having nitrogen atoms, such as functional groups represented by following formulae: —$NR_2$, >C=NH, >C=N—, —CN, —NCO, —OCN, —SCN, —NO, —$NO_2$, —NCS, —$CONR_2$, and —CONR—, wherein R is a hydrocarbon group; functional groups each having a carbonyl group or thiocarbonyl group, such as functional groups represented by following formulae: >C=O, >C=S, —CH=O, —CH=S, —COOR, and —CSOR, wherein R is a hydrocarbon group; epoxy group, and thioepoxy group.

The addition block copolymer (I) can have one or more of these functional groups in the polymer block (A) and can be crosslinked therethrough.

Among them, the functional group (b) in the polymer block (A) is preferably hydroxyl group for further easier formation of crosslinks.

When the addition block copolymer (I) has the functional group (b) in the polymer block (A) and is crosslinked therethrough, the content of the functional group (b) in the polymer block (A) can vary depending on, for example, the number of bonded blocks and the molecular weight of the addition block copolymer (I), and whether the polymer block (A) has only the functional group (b) or has the ($C_1$–$C_8$ alkyl)styrene-derived structural unit (a) in addition to the functional group (b).

When the addition block copolymer (I) is an addition block copolymer, or its hydrogenated product, which has not the ($C_1$–$C_8$ alkyl)styrene-derived structural unit (a) but the functional group (b) alone in the polymer block (A), is crosslinked through the functional group (b) (hereinafter may be referred to as "addition block copolymer (Ib)") but is not crosslinked in the polymer block (B), the number of the functional group (b) is preferably from 1.2 to 1000 and more preferably from 1.6 to 200 per molecule of the addition block copolymer (Ib). When the addition block copolymer (I) has no ($C_1$–$C_8$ alkyl)styrene-derived structural unit (a), has the functional group (b) both in the polymer block (A) and in the polymer block (B) and is crosslinked both in the polymer block (A) and in the polymer block (B), the number of functional groups is preferably from 2.2 to 1100, and more preferably from 1.6 to 230 per molecule of the addition block copolymer (Ib). The number of functional groups in the polymer block (B) in this case is preferably from 0.5 to 30 per molecule of the addition block copolymer (Ib). The number of the functional group (b) in the addition block copolymer (I) can be determined by, for example, HPLC, NMR, GPC, or titration.

When the addition block copolymer (I) has both the ($C_1$–$C_8$ alkyl)styrene-derived structural unit (a) and the functional group (b) in the same or different polymer blocks (A), it is preferred that the content of the ($C_1$–$C_8$ alkyl)styrene-derived structural unit (a) is from 1 to 90% by weight based on the weight of the polymer block(s) (A) and the content of the functional group (b) is from 1 to 1000 groups per molecule of the addition block copolymer (I).

The number of crosslinks in the polymer block (A) of the addition block copolymer (I) is preferably 2 or more per molecule of the addition block copolymer (I). The number of crosslinks in the polymer block (A) can be controlled by adjusting the number of functional groups introduced into the polymer block (A) and the amount of the crosslinking agent (IV) used.

The addition block copolymer (I) may further comprise other aromatic vinyl compound units than the ($C_1$–$C_8$ alkyl)styrene-derived structural unit (a) as aromatic vinyl compound units constituting the polymer block (A). Such other aromatic vinyl compound units include, for example, units derived from styrene, α-methylstyrene, β-methylstyrene, t-butylstyrene, monofluorostyrene, difluorostyrene, monochlorostyrene, dichlorostyrene, methoxystyrene, vinylnaphthalene, vinylanthracene, indene, and acetonaphthylene. The addition block copolymer (I) may have one or more of these units. Among them, styrene units are preferred as the other aromatic vinyl compound units.

When the polymer block (A) has the other aromatic vinyl compound units in addition to the ($C_1$–$C_8$ alkyl)styrene-derived structural unit (a), the ($C_1$–$C_8$ alkyl)styrene-derived structural unit (a) and the other aromatic vinyl compound units can be combined in any form such as random form, block form, and tapered block form.

Where necessary, the polymer block (A) may further comprise small amounts of structural units derived from other copolymerizable monomers in addition to the structural unit(s) derived from aromatic vinyl compound(s). In this case, the proportion of the structural units derived from the other copolymerizable monomers is preferably 30% by weight or less, and more preferably 10% by weight or less based on the total weight of the polymer block (A). The other copolymerizable monomers for use herein include, for example, methacrylic esters, acrylic esters, 1-butene, pentenes, hexenes, butadienes, isoprene, methyl vinyl ether, and other monomers that can undergo ion polymerization. These other copolymerizable monomers may constitute any form such as random form, block form, and tapered block form.

Examples of conjugated diene compounds constituting the polymer block (B) in the addition block copolymer (I) include isoprene, butadienes, hexadienes, 2,3-dimethyl-1,3-butadiene, and 1,3-pentadiene. The polymer block (B) may comprise only one of these conjugated diene compounds or may comprise two or more of these conjugated diene compounds. When the polymer block (B) has structural units derived from two or more of conjugated diene compounds, these structural units may be combined in any form such as random, tapered, block, and any combination of these forms.

For satisfactory weather resistance, heat resistance, and other properties, the polymer block (B) is preferably a polyisoprene block comprising monomer units mainly containing isoprene units, or a corresponding hydrogenated polyisoprene block in which part or all of the unsaturated bonds of the polyisoprene block are hydrogenated; a polybutadiene block comprising monomer units mainly containing butadiene units, or a corresponding hydrogenated polybutadiene block in which part or all of the unsaturated bonds of the polybutadiene block are hydrogenated; or an isoprene/butadiene copolymer block comprising monomer units mainly containing isoprene units and butadiene units, or a corresponding hydrogenated isoprene/butadiene copolymer block in which part or all of the unsaturated bonds thereof are hydrogenated. The polymer block (B) is more preferably a hydrogenated block of the polyisoprene block, the polybutadiene block, or the isoprene/butadiene copolymer block.

In the polyisoprene block which can be a constitutional block of the polymer block (B), the units derived from isoprene include, before hydrogenation, at least one group selected from the group consisting of a 2-methyl-2-butene-1,4-diyl group [—$CH_2$—$C(CH_3)$=$CH$—$CH_2$—; 1,4-bonded isoprene unit], an isopropenylethylene group [—CH($C(CH_3)$=$CH_2$)—$CH_2$—; 3,4-bonded isoprene unit], and a 1-methyl-1-vinylethylene group [—$C(CH_3)(CH=CH_2)$—$CH_2$—; 1,2-bonded isoprene unit]. The proportions of individual units are not specifically limited.

In the polybutadiene block which can be a constitutional block of the polymer block (B), it is preferred that, before hydrogenation, the butadiene units include from 70 to 20% by mole, and particularly from 65 to 40% by mole of 2-butene-1,4-diyl groups (—$CH_2$—$CH$=$CH$—$CH_2$—; 1,4-bonded butadiene unit); and from 30 to 80% by mole, and particularly from 35 to 60% by mole of vinylethylene groups [—$CH(CH=CH)$—$CH_2$—; 1,2-bonded butadiene unit]. When the amount of the 1,4-bonds in the polybutadiene block is within the above-specified range of 70 to 20% by mole, the rubber properties become further satisfactory.

In the isoprene/butadiene copolymer block which can be a constitutional block of the polymer block (B), the units derived from isoprene include, before hydrogenation, at least one group selected from the group consisting of a 2-methyl-2-butene-1,4-diyl group, an isopropenylethylene group, and a 1-methyl-1-vinylethylene group, and the units derived from butadiene include a 2-butene-1,4-diyl group and/or a vinylethylene group. The proportions of individual units are not specifically limited. The arrangement or configuration of the isoprene units and the butadiene units in the isoprene/butadiene copolymer block can be any form such as random form, block form, and tapered block form. To further effectively improve the rubber properties, the molar ratio of the isoprene units to the butadiene units is preferably in a range from 1:9 to 9:1, and more preferably in a range from 3:7 to 7:3.

For further satisfactory heat resistance and weather resistance of the thermoplastic elastomer composition comprising the addition block copolymer (I), part or all of unsaturated double bonds in the polymer block (B) of the addition block copolymer (I) are preferably hydrogenated. The hydrogenation ratio in this conjugated diene polymer block is preferably 60% by mole or more, more preferably 80% by mole or more, and further preferably 100% by mole. When the hydrogenation ratio is approximately 100% by mole, the reactivity between the polymer block (B) and the crosslinking agent (IV) decreases, and that between the at least one of the ($C_1$–$C_8$ alkyl)styrene-derived structural unit (a) and the functional group (b) with the crosslinking agent (IV) increases in dynamic vulcanization for the preparation of the thermoplastic elastomer composition of the present invention. Thus, crosslinks can be more selectively introduced into the polymer block (A) constituting the hard segment.

Where necessary, the polymer block (B) may further comprise small amounts of structural units derived from other copolymerizable monomers in addition to the structural units derived from conjugated dienes. In this case, the proportion of the other copolymerizable monomers is preferably 30% by weight or less and more preferably 10% by weight or less based on the total weight of the polymer block (B) constituting the addition block copolymer (I). The other copolymerizable monomers for use herein include, for example, styrene, p-methylstyrene, α-methylstyrene, and other monomers that can undergo ion polymerization.

The degree of crosslinking in the addition block copolymer (I) can be controlled according to the polymer composition, use, and other factors of the thermoplastic elastomer composition of the present invention comprising the addition block copolymer (I). For further excellent strain recovery (rubber elasticity) at high temperatures, the degree of crosslinking is generally preferably such that, when an addition block copolymer after crosslinking is subjected to Soxhlet extraction with cyclohexane for 10 hours, the weight percentage of gel (gel fraction) which is not dissolved in cyclohexane and remains to the weight of the crosslinked addition block copolymer (I) before extraction is 80% or more.

The addition block copolymer (I) for use in the thermoplastic elastomer composition of the present invention has crosslinks formed in the polymer block (A) constituting the hard segment. In this feature, it can be distinguished from conventional crosslinked products of block copolymers which comprise an aromatic vinyl compound polymer block and a conjugated diene compound polymer block and are crosslinked in the conjugated diene compound polymer block. By using the addition block copolymer (I) which is crosslinked at least in the polymer block (A) constituting the hard segment, the present invention can provide thermoplastic elastomer compositions and molded articles thereof each having excellent strain recovery at high temperatures and satisfactory rubber properties, as mentioned above.

The molecular weight of the addition block copolymer (I) is not specifically limited. From the viewpoints of the mechanical properties and moldability of the resulting thermoplastic elastomer composition, it is preferred that, before hydrogenation and dynamic vulcanization [i.e., in the addition block copolymer ($I_0$) before hydrogenation], the number-average molecular weight of the polymer block (A) is from 2500 to 75000, and more preferably from 5000 to 50000, the number-average molecular weight of the polymer block (B) is from 10000 to 300000, and more preferably from 30000 to 250000, and the total number-average molecular weight of the entire addition block copolymer (I) [the addition block copolymer ($I_0$) before hydrogenation] is from 12500 to 2000000 and more preferably from 50000 to 1000000. The term "number-average molecular weight (Mn)" as used herein means a number-average molecular weight determined by gel permeation chromatography (GPC) based on a standard polystyrene calibration curve.

The polyolefin (II) for use in the thermoplastic elastomer composition of the present invention includes, for example, ethylene polymers, propylene polymers, polybutene-1, and poly(4-methylpentene-1). Each of these polyolefins can be used alone or in combination. Among them, ethylene polymers and/or propylene polymers are preferred as the polyolefin (II), of which propylene polymers are especially preferred, for satisfactory moldability.

Such ethylene polymers preferably used as the polyolefin (II) include, for example, high-density polyethylenes, medium-density polyethylenes, low-density polyethylenes, and other ethylene homopolymers; ethylene-butene-1 copolymers, ethylene-hexene copolymers, ethylene-heptene copolymers, ethylene-octene copolymers, ethylene-4-methylpentene-1 copolymers, ethylene-vinyl acetate copolymers, ethylene-acrylic acid copolymers, ethylene-acrylate copolymers, ethylene-methacrylic acid copolymers, ethylene-methacrylate copolymers, and other ethylene copolymers. Among them, high-density polyethylenes, medium-density polyethylenes, and/or low-density polyethylenes are more preferred for further satisfactory moldability.

Such propylene polymers preferably used as the polyolefin (II) include, for example, propylene homopolymers; ethylene-propylene random copolymers, ethylene-propylene block copolymers, propylene-butene-1 copolymers, propylene-ethylene-butene-1 copolymers, and propylene-4-methylpentene-1 copolymers. Among them, propylene homopolymers, ethylene-propylene random copolymers and/or ethylene-propylene block copolymers are more preferred for further satisfactory moldability.

The thermoplastic elastomer composition of the present invention must comprise 10 to 300 parts by weight of the polyolefin (II) relative to 100 parts by weight of the addition block copolymer (I). By comprising 10 to 300 parts by weight of the polyolefin (II), the thermoplastic elastomer composition has a morphological structure in which the polyolefin (II) forms a continuous phase, and fine particles of the addition block copolymer (I) crosslinked at least in the polymer block (A) are dispersed. Thus, strain recovery at high temperatures, flexible rubber properties, and satisfactory moldability are imparted to the thermoplastic elastomer composition.

When the content of the polyolefin (II) is less than 10 parts by weight, the resulting thermoplastic elastomer composition will have insufficient thermoplasticity and deteriorated moldability. If it exceeds 300 parts by weight, the thermoplastic elastomer composition will have insufficient flexibility. For further satisfactory moldability, flexibility, and other properties, the thermoplastic elastomer composition of the present invention preferably comprises 12 to 200 parts by weight, and more preferably 14 to 100 parts by weight of the polyolefin (II) relative to 100 parts by weight of the addition block copolymer (I).

The rubber softener (III) for use in the thermoplastic elastomer composition of the present invention according to necessity is not specifically limited in its type or species and can be any of mineral oil softeners and/or synthetic resin softeners. Such mineral oil softeners are generally mixtures of aromatic hydrocarbons, naphthene hydrocarbons and paraffin hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". Among them, paraffin oils are preferably used as the rubber softener in the present invention.

Such paraffin oils have a dynamic viscosity at 40° C. of preferably from 20 to 800 cst (centistokes) and more preferably from 50 to 600 cst, a pour point of preferably from 0° C. to −40° C., and more preferably from 0° C. to −30° C., and a flash point of preferably from 200° C. to 400° C., and more preferably from 250° C. to 350° C. as determined by the Cleveland Open Cup (COC) method. The synthetic resin softeners can be any of, for example, polybutenes and low-molecular-weight polybutadienes.

The thermoplastic elastomer composition of the present invention comprises 0 to 300 parts by weight, and preferably 50 to 250 parts by weight of the rubber softener (III) relative to 100 parts by weight of the addition block copolymer (I). If the content of the rubber softener (III) exceeds the above-specified range of 300 parts by weight, the rubber softener (III) will bleed out, and the resulting thermoplastic elastomer composition and molded articles thereof will have decreased mechanical properties.

The thermoplastic elastomer composition of the present invention may further comprise other polymers within ranges not deteriorating the advantages of the present invention. Such other polymers for use herein include, for example, poly(phenylene ether) resins; polyamide 6, polyamide 6.6, polyamide 6.10, polyamide 11, polyamide 12, polyamide 6.12, poly(hexamethylenediamine terephthalamide), poly(hexamethylenediamine isophthalamide), xylene-group-containing polyamides, and other polyamide resins; poly(ethylene terephthalate), poly(butylene terephthalate), and other polyester resins; poly(methyl acrylate), poly(methyl methacrylate), and other acrylic resins; polyoxymethylene homopolymers, polyoxymethylene copolymers, and other polyoxymethylene resins; styrene homopolymers, acrylonitrile-styrene resins, acrylonitrile-butadiene-styrene resins, and other styrenic resins; polycarbonate resins; ethylene-propylene copolymer rubbers (EPM), ethylene-propylene-non-conjugated diene terpolymer rubbers (EPDM), and other ethylenic elastomers; styrene-butadiene copolymer rubber, styrene-isoprene copolymer rubbers, and other styrenic elastomers, hydrogenated products and modified products thereof; natural rubbers; synthetic isoprene rubbers, liquid polyisoprene rubbers, hydrogenated products and modified products thereof; chloroprene rubbers; acrylic rubbers; isobutylene-isoprene rubbers (butyl rubbers); acrylonitrile-butadiene rubbers; epichlorohydrin rubbers; silicone rubbers; fluorocarbon rubbers; chlorosulfonated polyethylenes; urethane rubbers; polyurethane elastomers; polyamide elastomers; polyester elastomers; and plasticized vinyl chloride resins.

The content of the other polymers is preferably within ranges not adversely affecting the flexibility and mechanical properties of the resulting thermoplastic elastomer composition and is preferably 200 parts by weight or less relative to 100 parts by weight of the addition block copolymer (I).

Where necessary, the thermoplastic elastomer composition of the present invention may further comprise inorganic fillers. Such inorganic fillers for use in the thermoplastic elastomer composition of the present invention include, for example, calcium carbonate, talc, clay, synthetic silicon, titanium oxide, carbon black, barium sulfate, mica, glass fibers, whiskers, carbon fibers, magnesium carbonate, glass powders, metal powders, kaolin, graphite, molybdenum disulfide, and zinc oxide. Each of these inorganic fillers can be used alone or in combination. The content of the organic fillers is preferably within ranges not deteriorating performance of the resulting thermoplastic elastomer and is generally preferably 50 parts by weight or less relative to 100 parts by weight of the addition block copolymer (I).

The thermoplastic elastomer composition of the present invention may further comprise, according to necessity, one or more of lubricants, light stabilizers, pigments, heat stabilizers, anti-fogging agents, flame retarders, antistatic agents, silicone oils, antiblocking agents, UV absorbers, and antioxidants. Examples of such antioxidants are hindered phenol antioxidants, hindered amine antioxidants, phosphorus-containing antioxidants, and sulfur-containing antioxidants.

The thermoplastic elastomer composition of the present invention preferably has a specific morphological structure (dispersion structure) in which a phase comprising the addition block copolymer (I) which is crosslinked at least in the polymer block (A) or a flexible or soft phase comprising the addition block copolymer (I) and rubber softener (III) is finely dispersed in a continuous phase (matrix phase) comprising the thermoplastic polyolefin (II). The diameter of dispersed particles in the finely dispersed phase is preferably from 0.1 µm to 30 µm and more preferably from 0.1 µm to 10 µm. However, the morphological structure is not limited to the aforementioned one, and it is also acceptable that a phase comprising the addition block copolymer (I) and the rubber softener (III) and a phase comprising the polyolefin (II) constitute a co-continuous phase in the thermoplastic elastomer composition of the present invention.

The thermoplastic elastomer composition of the present invention may be produced by a process comprising the steps of previously preparing an addition block copolymer (I) which is crosslinked at least in a polymer block (A); adding 10 to 300 parts by weight of a polyolefin (II), 0 to 300 parts by weight of a rubber softener (III), and where necessary other polymers and/or additives to 100 parts by weight of the crosslinked addition block copolymer (I), and heating and kneading the resulting mixture.

However, the thermoplastic elastomer composition of the present invention is preferably produced by the following process. The process includes the step of dynamic vulcanization (dynamic crosslinking) of a mixture under melting conditions, which mixture is obtained by adding 10 to 300 parts by weight of a polyolefin (II), 0 to 300 parts by weight of a rubber softener (III), and 0.01 to 20 parts by weight of a crosslinking agent (IV) with, where necessary, the aforementioned other polymers and/or additives to 100 parts by weight of at least one addition block copolymer ($I_0$) (addition block copolymer before crosslinking) selected from among block copolymers and hydrogenated products thereof, which block copolymers each have at least one polymer block (A) comprising aromatic vinyl compound units, and at least one polymer block (B) comprising conjugated diene compound units, and have at least one of a ($C_1$–$C_8$ alkyl)styrene-derived structural unit (a) and a functional group (b) in the polymer block (A). By employing this process, the thermoplastic elastomer composition of the present invention can be smoothly produced, in which individual components are homogeneously mixed and the addition block copolymer (I) is crosslinked in at least one of the ($C_1$–$C_8$ alkyl)styrene-derived structural unit (a) and the functional group (b) in the polymer block (A).

The term "dynamic vulcanization under melting conditions" as used herein means subjecting the mixture under melting conditions to kneading to thereby crosslink the mixture with the application of shearing force.

The addition block copolymer ($I_0$) for use in the production of the thermoplastic elastomer composition of the present invention has the same configuration (e.g., the types of constitutional monomers, the composition, and the molecular weight of the block copolymer) as the crosslinked addition block copolymer (I) constituting the thermoplastic elastomer composition of the present invention, except that it is an addition block copolymer in which the at least one of the ($C_1$–$C_8$ alkyl)styrene-derived structural unit (a) and the functional group (b) in the polymer block (A) has not been crosslinked.

The addition block copolymer ($I_0$) before crosslinking for use in the production of the thermoplastic elastomer composition of the present invention can be produced by any process, as long as it can yield an addition block copolymer ($I_0$) having at least one of a ($C_1$–$C_8$ alkyl)styrene-derived structural unit (a) and a functional group (b) in the polymer block (A). For example, the addition block copolymer ($I_0$) can be produced by anionic polymerization, cation polymerization, and other ion polymerization procedures, radical polymerization, and any other known polymerization procedures.

An addition block copolymer ($I_0$) having a ($C_1$–$C_8$ alkyl)styrene-derived structural unit (a) in the polymer block (A) can be produced by using an alkylstyrene having at least one alkyl group combined with its benzene ring as at least part of the aromatic vinyl compounds in a polymerization process for the production of the polymer block (A) according to such a known polymerization procedure.

An addition block copolymer ($I_0$) having a functional group (b) in the polymer block (A) can be produced by using, for example, a termination reaction, an initiation reaction, copolymerization of functionalized monomers, and a polymer reaction. For example, in the synthesis of an addition block copolymer using a bifunctional anionic polymerization initiator, the addition block copolymer ($I_0$) having the functional group (b) at an end of the polymer block (A) can be produced by functionalization using a compound having a group and serving as a terminal-treatment agent. Such groups just mentioned above include, for example, oxirane, carbonyl groups, thiocarbonyl groups, acid anhydrides, aldehyde groups, thioaldehyde groups, carboxylic ester groups, amide groups, sulfonic acid groups, sulfonic ester groups, amino groups, imino groups, nitrile groups, epoxy groups, sulfide groups, isocyanate groups, and isothiocyanate groups.

An addition block copolymer ($I_0$) having the functional group (b) at some midpoint in the molecular chain of the polymer block (A) can be produced, for example, according to Macromolecules 1995; 28:8702.

The crosslinking agent (IV) can be a crosslinking agent that acts upon the ($C_1$–$C_8$ alkyl)styrene-derived structural unit (a) in the polymer block (A) to thereby form crosslinks [hereinafter referred to as "crosslinking agent (IVa)"], or a crosslinking agent (IV) that has a reactive group capable of reacting with the functional group (b) to thereby form crosslinks [hereinafter referred to as "crosslinking agent (IVb)"].

The crosslinking agent (IVa) is not specifically limited and can be any crosslinking agent, as long as it can act upon the ($C_1$–$C_8$ alkyl)styrene-derived structural unit (a) in the polymer block (A) of the addition block copolymer ($I_0$) during dynamic vulcanization under melting conditions to thereby form crosslinks in situ in the polymer block (A). The crosslinking agent (IVa) can be appropriately selected in view of reactivity depending on treatment conditions such as treatment temperature and treatment time in the dynamic vulcanization. One or more of bismaleimide compounds and organic peroxides can be preferably used as the crosslinking agent (IVa).

By using an addition block copolymer ($I_0$) in which all of unsaturated double bonds of the polymer block (B) are hydrogenated and by using abismaleimide compound as the crosslinking agent (IVa), the resulting addition block copolymer (I) is not crosslinked in the polymer block (B) but is selectively crosslinked in the ($C_1$–$C_8$ alkyl)styrene-derived structural unit (a) alone of the polymer block (A). By using an addition block copolymer ($I_0$) comprising a polymer block (B) having at least one unsaturated double bond and by using a bismaleimide compound as the crosslinking agent (IVa), the resulting addition block copolymer (I) is crosslinked both in the polymer block (A) having the ($C_1$–$C_8$ alkyl)styrene-derived structural unit (a) and in the polymer block (B).

By using an organic peroxide as the crosslinking agent (IVa), the resulting addition block copolymer (I) is crosslinked both in the polymer block (A) having the ($C_1$–$C_8$ alkyl)styrene-derived structural unit (a) and in the polymer block (B), regardless of whether or not an unsaturated bond is present in the polymer block (B) of the addition block copolymer ($I_0$).

The bismaleimide compound can be any of bismaleimide compounds that can induce crosslinking both in the alkyl group combined with the benzene ring and in the unsaturated double bond. Such bismaleimide compounds include, for example, N,N'-m-phenylene bismaleimide, N,N'-p-phenylene bismaleimide, N,N'-p-phenylene (1-methyl)bismaleimide, N,N'-2,7-naphthene bismaleimide, N,N'-m-naphthene bismaleimide, N,N'-m-phenylene-4-methyl bismaleimide, N,N'-m-phenylene (4-ethyl)bismaleimide, and tolylene bismaleimide. Each of these compounds can be used alone or in combination. Among them, N,N'-m-phenylene can be preferably used from the viewpoint of its reactivity.

The organic peroxide can be any of organic peroxides. Such organic peroxides include, for example, dicumyl peroxide, di-t-butyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butyl peroxyisopropylcarbonate, diacetyl peroxide, lauroyl peroxide, and t-butyl cumyl peroxide. Each of these organic peroxides can be used alone or in combination. Among them, 2,5-dimethyl-2,5-di(t-butylperoxy)hexane and dicumyl peroxide are preferably used for their reactivity.

A crosslinking accelerator and/or a coagent (crosslinking auxiliary) can be used in addition to the crosslinking agent (IVa) according to necessity. Such crosslinking accelerators include, for example, benzothiazyl disulfide, tetramethylthiuram disulfide, and other disulfide compounds. Such coagents include, for example, triallyl isocyanurate, divinylbenzene, ethylene glycol dimethacrylate, triethylene glycol dimethacrylate, and other polyfunctional monomers.

The crosslinking agent (IVb) is used corresponding to the type of the functional group (b) in the polymer block (A) of the addition block copolymer ($I_0$). When the functional group (b) is a functional group having an active hydrogen atom, such as a hydroxyl group, —SH, —$NH_2$, —NHR, —$CONH_2$, —CONHR, —CONH—, —$SO_3H$, —$SO_2H$, and —SOH, the crosslinking agent (IVb) can be isocyanate compounds such as monomeric isocyanate, isocyanate adducts such as aliphatic, alicyclic, aromatic, and biphenyl isocyanate adducts, and block isocyanates. Among them, preferred are polyisocyanate compounds each having two or more, preferably three or more, isocyanate groups. Such polyisocyanates include polyisocyanates having isocyanurate bonds and being prepared from hexamethylene diisocyanate. In this case, a tin catalyst, a titanium catalyst or another catalyst can be used for improving the reactivity between the isocyanate-compound crosslinking agent and the functional group (b) in the polymer block (A) of the addition block copolymer ($I_0$).

When the functional group (b) in the polymer block (A) is a hydroxyl group, the crosslinking agent (IVb) can be, for example, polyepoxy compounds, maleic anhydride, pyromellitic anhydride, and other polycarboxylic anhydrides, in addition to the isocyanate compounds.

When the functional group (b) in the polymer block (A) is a carboxyl group, the crosslinking agent (IVb) can be, for example, polyepoxy compounds, and polyamines. When the functional group (b) in the polymer block (A) is an epoxy group, the crosslinking agent (IVb) can be, for example, polycarboxylic acids and polyamines.

The amount of the crosslinking agent (IV) [the total amount when the crosslinking agent (IVa) and the crosslinking agent (IVb) are used in combination] is preferably from 0.01 to 20 parts by weight, and more preferably from 0.01 to 10 parts by weight relative to 100 parts by weight of the addition block copolymer ($I_0$) as mentioned above. If the amount of the crosslinking agent (IV) is less than 0.01 part by weight, sufficient crosslinks may not be formed in the polymer block (A). If it exceeds 20 parts by weight, the rubber softener (III) may bleed out, and the resulting thermoplastic elastomer composition and molded articles thereof may have decreased mechanical properties.

In terms of the equivalent of the functional group (b), the amount of the crosslinking agent (IVb) is preferably from 0.1 to 100 equivalents, and more preferably from 0.1 to 10 equivalents per equivalent of the functional group (b) in the polymer block (A) or per total equivalent of the functional group s (b) in the polymer block (A) and, if any, in the polymer block (B).

The dynamic vulcanization process under melting conditions for the production of the thermoplastic elastomer composition of the present invention converts the addition block copolymer ($I_0$) into an addition block copolymer (I) which is crosslinked at least in its hard segment [polymer block (A)], by melting and kneading the addition block copolymer ($I_0$) and the polyolefin (II) or these two components with the rubber softener (III) to thereby disperse them finely and homogeneously, and forming crosslinks at least in the polymer block (A) in the addition block copolymer ($I_0$) by action of the crosslinking agent (IV). If a mixture comprising the addition block copolymer ($I_0$), the polyolefin (II), and if desired the rubber softener (III) is subjected to crosslinking under static conditions as in conventional vulcanization processes for rubbers, the polyolefin (II) will hardly form a continuous phase, and the resulting composition will not exhibit thermoplasticity in many cases.

For dynamic vulcanization under melting conditions for the production of the thermoplastic elastomer composition of the present invention, any machine can be used as long as it is a melt kneading machine capable of mixing individual components homogeneously. Such melt kneading machines include, for example, single screw extruders, twin screw extruders, kneaders, and Banbury mixers. Twin screw extruders that can exhibit a great shearing force during kneading and can be operated continuously are preferably used.

Although not specifically limited, the dynamic vulcanization process using an extruder for the production of the thermoplastic elastomer composition under melting conditions can be performed, for example, in the following manner.

Initially, an addition block copolymer ($I_0$) and a polyolefin (II) are mixed and fed into a hopper of an extruder. In this step, the polyolefin (II), a crosslinking agent (IV), and a rubber softener (III) are initially added to the addition block copolymer ($I_0$) or a part or all of them are added at some middle portion of the extruder, and the components are melted, kneaded and extruded. Another possible option is to perform the melt kneading stepwise by using two or more extruders.

The melt kneading temperature can be appropriately selected within ranges in which the addition block copolymer ($I_0$) and the polyolefin (II) are melted and the crosslinking agent (IV) reacts and is generally preferably from 160° C. to 270° C., and more preferably from 180° C. to 240° C. The melt kneading time is preferably from about 30 seconds to about 5 minutes.

The thermoplastic elastomer composition of the present invention obtained by the dynamic vulcanization under melting conditions as above generally has a specific morphological structure in which a phase comprising the addition block copolymer (I) crosslinked at least in the polymer block (A) or a flexible or soft phase comprising the addition block copolymer (I) and rubber softener (III) is finely dispersed in a continuous phase (matrix phase) comprising the thermoplastic polyolefin (II). The dispersed particles of the finely dispersed phase have a diameter of preferably from 0.1 µm to 30 µm and more preferably from 0.1 µm to 10 µm. However, the morphological structure is not limited to the aforementioned one, and it is also acceptable that a phase comprising the addition block copolymer (I) and the rubber softener (III) and a phase comprising the polyolefin (II) constitute a co-continuous phase in the thermoplastic elastomer composition of the present invention. The composition obtained in this case can have excellent thermoplasticity by appropriately setting the amount of the crosslinking agent (IV) and kneading conditions.

The thus-obtained thermoplastic elastomer composition of the present invention has excellent moldability and can be molded or processed by a molding procedure such as injection molding, extrusion molding, inflation molding, T-die film molding, laminate molding, blow molding, hollow molding, compression molding, and calendering.

Molded articles obtained by molding the thermoplastic elastomer composition of the present invention can be used in various applications. For example, the molded articles can be used in instrumental panels, center panels, center console boxes, door trims, pillars, assist grips, steering wheels, airbag covers, air ducts, and other interior automotive trims; weather strips, bumpers, moldings, sealing materials between glass and frames, and other exterior automotive trims; bumpers for vacuum cleaners, remote control switches, key tops of office automation equipment, TV apparatus, stereos, and other home-appliance parts; hydroscopes, underwater camera covers, and other underwater products; covering parts, industrial parts with packing, for example, for sealing, waterproofing, soundproofing, and vibration isolation; racks, pinion boots, suspension boots, constant velocity joint boots; and other automotive functional parts; belts, hoses, tubes; wire covering, silencer gears, and other electric/electronic parts; sporting goods; sundry goods; stationery; doors, window frame materials, and other construction materials; joints; valve parts; gaskets for medical syringes, bags, tubes, and other medical appliances; hot melt sealing materials; rubber threads, stretchable films, and other stretchable materials; wires, cables, and other articles.

EXAMPLES

The present invention will be illustrated in further detail with reference to examples, comparative examples, and reference examples below, which are not intended to limit the scope of the invention. Physical properties and qualities of molded articles in the examples, comparative examples, reference examples, and comparative examples were determined according to the following methods.

(1) Determination of Hardness (JIS-A)

Plural plies of a press sheet comprising a thermoplastic elastomer composition obtained in any of the examples and comparative examples were stacked to a set thickness (12 mm), and A-type hardness was determined according to Japanese Industrial Standards (JIS) K 6301.

(2) Determination of Tensile Strength at Break and Tensile Elongation at Break

A JIS #3 dumbbell specimen was cut from a press sheet comprising a thermoplastic elastomer composition obtained in any of the examples and comparative examples, and the tensile strength at break and tensile elongation at break of the specimen were determined at 500 mm/min according to JIS K 6301 using an Autograph (available from Shimadzu Corporation).

(3) Determination of Compression Set

A press sheet comprising a thermoplastic elastomer composition obtained in any of the examples and comparative examples was left stand for 22 hours under conditions at a temperature of 120° C. and at a compressive deformation of 25% according to JIS K 6301, and the compression set of the press sheet was then determined.

(4) Determination of Gel Fraction

A total of 1 g of a sample obtained according to any of the examples, comparative examples, reference examples, and comparative reference examples was subjected to Soxhlet extraction with cyclohexane for 10 hours. After extraction, an extraction residue was separated, was dried in vacuo, and the weight of the extraction residue was determined. The weight percentage of the determined weight to the weight of the specimen before extraction was determined as the gel fraction.

The gel fractions of samples comprising crosslinked thermoplastic elastomer compositions obtained according to Example 4, Comparative Example 8, Example 22 and Reference Example 2, respectively, were determined in the following manner. The weight of a crosslinked product of an addition block copolymer ($I_0$-1a), an addition block copolymer (12) or an addition block copolymer ($I_0$-8b) contained in the residue (composition) after extraction was determined by calculation by subtracting the weight of a polyolefin (II) contained in the sample before extraction from the weight of the residue (composition) after extraction. Next, the ratio (% by weight) of the weight of the crosslinked product of the addition block copolymer ($I_0$-1a), the addition block copolymer (12) or the addition block copolymer ($I_0$-8b) contained in the residue to the weight of the crosslinked product of the addition block copolymer ($I_0$-1a), the addition block copolymer (12) or the addition block copolymer ($I_0$-8b) contained in the thermoplastic elastomer composition before crosslinking was determined as the gel fraction.

(5) Determination of Dynamic Viscoelasticity

A press sheet obtained by using a thermoplastic elastomer composition prepared in Reference Example 5 or Comparative Reference Example 7 was cut into a strip specimen 5 mm wide. The dynamic viscoelasticity of the specimen was determined under conditions at a strain of 0.3%, a frequency of 1 Hz, and a heating rate of 3° C./min using a viscoelasticity analyzer "DVE-V4" available from Rheology Co., Ltd.

The polyolefins (II), softeners (III) for rubbers, and crosslinking agents (IV) used in the following examples, comparative examples, and comparative reference examples are as follows.

Polyolefin (II-1)
Polypropylene (homopolymer) ["Grand Polypro S 13B" available from Grand Polymer Co., Ltd., melt flow rate=700 g/10-min]

Polyolefin (II-2)
Polypropylene (random copolymer) ["Grand Polypro B 221" available from Grand Polymer Co., Ltd., melt flow rate=1 g/10-min]

Polyolefin (II-3)
Polypropylene (homopolymer) ["Grand Polypro B 101" available from Grand Polymer Co., Ltd., melt flow rate=0.8 g/10-min]

Polyolefin (II-4)
Polypropylene (block copolymer) ["Grand Polypro J 701WA" available from Grand Polymer Co., Ltd., melt flow rate=1 g/10-min]

Polyolefin (II-5)
Polypropylene (block copolymer) ["Grand Polypro J 705WA" available from Grand Polymer Co., Ltd., melt flow rate=15 g/10-min]

Rubber Softener (III)
Paraffin process oil ["PW-380" available from Idemitsu Kosan Co., Ltd.]

Crosslinking Agent (IVa-1)
N,N'-m-Phenylene bismaleimide ["VULNOC PM" available from Ouchisinko Chemical Industrial Co., Ltd.]

Crosslinking Agent (IVa-2)
Dicumylperoxide ["Percumyl D" available from NOF Corporation]

Crosslinking Agent (IVa-3)
2,5-Dimethyl-2,5-di(t-butylperoxy)hexane ["Perhexa 25B-40" available from NOF Corporation]

Crosslinking Agent (IVb-4)
Polyisocyanate prepared from hexamethylene diisocyanate and having isocyanurate bonds ["Collonate HX" available from Nippon Polyurethane Industry Co., Ltd., number of isocyanate groups: three per molecule]

Crosslinking Agent (IVb-5)
Pyromellitic anhydride

Production Example 1

Production of Addition Block Copolymer ($I_0$-1a)

In a pressure-tight case equipped with a stirrer, 2700 g of cyclohexane, 71 g of p-methylstyrene monomer, and 2 ml of 1.3 mol cyclohexane solution of sec-butyllithium were placed and polymerized at 50° C. for 120 minutes. The resulting mixture was further polymerized with 6.27 g of tetrahydrofuran and 265 g of butadiene monomer for 120 minutes, and was further polymerized with 71 g of p-methylstyrene monomer for 120 minutes. The polymerization was then terminated by the addition of methanol and thereby yielded a poly(p-methylstyrene)-polybutadiene-poly(p-methylstyrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene)-hydrogenated polybutadiene-poly(p-methylstyrene) triblock copolymer [Mn=260000; proportions of polymer blocks=17.5/65/17.5 (by weight); hydrogenation ratio of polybutadiene block=99% by mole] [addition block copolymer ($I_0$-1a)].

Production Example 2

Production of Addition Block Copolymer ($I_0$-2a)

In a pressure-tight case equipped with a stirrer, 2700 g of cyclohexane, 18.6 g of p-methylstyrene monomer, and 1.86 ml of 1.3 mol cyclohexane solution of sec-butyllithium were placed and polymerized at 50° C. for 120 minutes. The resulting mixture was further polymerized with 46.1 g of styrene monomer for 60 minutes, was further polymerized with 6.19 g of tetrahydrofuran and 240 g of butadiene monomer for 120 minutes, was further polymerized with 46.1 g of styrene monomer at 50° C. for 60 minutes, and was further polymerized with 18.6 g of p-methylstyrene monomer for 120 minutes. The polymerization was then terminated by the addition of methanol and thereby yielded a poly(p-methylstyrene)-polystyrene-polybutadiene-polystyrene-poly(p-methylstyrene) pentablock copolymer. The pentablock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene)-polystyrene-hydrogenated polybutadiene-polystyrene-poly(p-methylstyrene) pentablock copolymer [Mn=260000; proportions of polymer blocks=5/

12.5/65/12.5/5 (by weight); hydrogenation ratio of polybutadiene block=99% by mole] [addition block copolymer (I$_0$-2a)].

Production Example 3

Production of Addition Block Copolymer (I$_0$-3a)

In a pressure-tight case equipped with a stirrer, 2700 g of cyclohexane, 71.3 g of p-methylstyrene monomer, and 8.84 ml of 1.3 mol cyclohexane solution of sec-butyllithium were placed and polymerized at 50° C. for 120 minutes. The resulting mixture was further polymerized with 6.27 g of tetrahydrofuran and 265 g of butadiene monomer for 120 minutes, and was further polymerized with 71 g of p-methylstyrene monomer for 120 minutes. The polymerization was then terminated by the addition of methanol and thereby yielded a poly(p-methylstyrene)-polybutadiene-poly(p-methylstyrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene)-hydrogenated polybutadiene-poly(p-methylstyrene) triblock copolymer [Mn=60000; proportions of polymer blocks=17.5/65/17.5 (by weight); hydrogenation ratio of polybutadiene block=99% by mole] [addition block copolymer (I$_0$-3a)].

Production Example 4

Production of Addition Block Copolymer (I$_0$-4a)

In a pressure-tight case equipped with a stirrer, 2700 g of cyclohexane, 71 g of 2,4,6-trimethylstyrene monomer, and 2.47 ml of 1.3 mol cyclohexane solution of sec-butyllithium were placed and polymerized at 50° C. for 120 minutes. The resulting mixture was further polymerized with 6.41 g of tetrahydrofuran and 333 g of butadiene monomer for 120 minutes, and was further polymerized with 71 g of 2,4,6-trimethylstyrene monomer for 120 minutes. The polymerization was then terminated by the addition of methanol and thereby yielded a poly(2,4,6-trimethylstyrene)-polybutadiene-poly(2,4,6-trimethylstyrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(2,4,6-trimethylstyrene)-hydrogenated polybutadiene-poly(2,4,6-trimethylstyrene) triblock copolymer [Mn=200000; proportions of polymer blocks=15/70/15 (by weight); hydrogenation ratio of polybutadiene block=99% by mole] [addition block copolymer (I$_0$-4a)].

Production Example 5

Production of Addition Block Copolymer (I$_0$-5a)

In a pressure-tight case equipped with a stirrer, 2700 g of cyclohexane, 70 g of a 40:60 monomer mixture of p-methylstyrene and styrene, and 2.52 ml of 1.3 mol cyclohexane solution of sec-butyllithium were placed and polymerized at 50° C. for 120 minutes. The resulting mixture was further polymerized with 326.6 g of a 60:40 monomer mixture of isoprene and butadiene for 120 minutes, and was further polymerized with 70 g of a 40:60 monomer mixture of p-methylstyrene and styrene for 120 minutes. The polymerization was then terminated by the addition of methanol and thereby yielded a poly(p-methylstyrene/styrene)-poly(isoprene/butadiene)-poly(p-methylstyrene/styrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene/styrene)-hydrogenated poly(isoprene/butadiene)-poly(p-methylstyrene/styrene) triblock copolymer [Mn=200000; proportions of polymer blocks=15/70/15 (by weight); hydrogenation ratio of poly(isoprene/butadiene) block=99% by mole] [addition block copolymer (I$_0$-5a)].

Production Example 6

Production of Addition Block Copolymer (I$_0$-6a)

In a pressure-tight case equipped with a stirrer, 2700 g of cyclohexane, 70 g of a 20:80 monomer mixture of p-methylstyrene and styrene, and 2.52 ml of 1.3 mol cyclohexane solution of sec-butyllithium were placed and polymerized at 50° C. for 120 minutes. The resulting mixture was further polymerized with 326.6 g of a 60:40 monomer mixture of isoprene and butadiene for 120 minutes, and was further polymerized with 70 g of a 20:80 monomer mixture of p-methylstyrene and styrene for 120 minutes. The polymerization was then terminated by the addition of methanol and thereby yielded a poly(p-methylstyrene/styrene)-poly(isoprene/butadiene)-poly(p-methylstyrene/styrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene/styrene)-hydrogenated poly(isoprene/butadiene)-poly(p-methylstyrene/styrene) triblock copolymer [Mn=200000; proportions of polymer blocks=15/70/15 (by weight); hydrogenation ratio of poly(isoprene/butadiene) block=99% by mole] [addition block copolymer (I$_0$-6a)].

Production Example 7

Production of Addition Block Copolymer (I$_0$-7a)

In a pressure-tight case equipped with a stirrer, 2700 g of cyclohexane, 43 g of a 60:40 monomer mixture of p-methylstyrene and styrene, and 2.52 ml of 1.3 mol cyclohexane solution of sec-butyllithium were placed and polymerized at 50° C. for 120 minutes. The resulting mixture was further polymerized with 390 g of isoprene monomer for 120 minutes, and was further polymerized with 43 g of a 60:40 monomer mixture of p-methylstyrene and styrene for 120 minutes. The polymerization was then terminated by the addition of methanol and thereby yielded a poly(p-methylstyrene/styrene)-polyisoprene-poly(p-methylstyrene/styrene) triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a poly(p-methylstyrene/styrene)-hydrogenated polyisoprene-poly(p-methylstyrene/styrene) triblock copolymer [Mn=200000; proportions of polymer blocks=9/82/9 (by weight); hydrogenation ratio of polyisoprene block=99% by mole] [addition block copolymer ($I_0$-7a)].

Production Example 8

Production of Addition Block Copolymer ($I_0$-8b)

In a pressure-tight case equipped with a stirrer, 2700 g of cyclohexane, 6.4 g of tetrahydrofuran, 308 g of butadiene monomer, and 29 g of dilithio-polybutadiene as a bifunctional initiator were placed and were polymerized at 50° C. for 120 minutes. The resulting mixture was further polymerized with 144 g of styrene monomer at 50° C. for 60 minutes, was subjected to addition with 6 g of ethylene oxide, the polymerization was then terminated by the addition of methanol and thereby yielded a polystyrene-polybutadiene-polystyrene triblock copolymer having hydroxyl groups at both ends. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a polystyrene-hydrogenated polybutadiene-polystyrene triblock copolymer having hydroxyl groups at both ends [Mn=60000; hydroxyl group content: 1.6 groups per molecule; proportions of polymer blocks=15/70/15 (by weight); hydrogenation ratio of polybutadiene block=99% by mole] [addition block copolymer ($I_0$-8b)].

Production Example 9

Production of Addition Block Copolymer ($I_0$-9b)

In a pressure-tight case equipped with a stirrer, 2700 g of cyclohexane, 6.4 g of tetrahydrofuran, 331 g of butadiene monomer, and 5.8 g of dilithio-polybutadiene as a bifunctional initiator were placed and were polymerized at 50° C. for 120 minutes. The resulting mixture was further polymerized with 144 g of styrene monomer at 50° C. for 60 minutes, was subjected to addition with 1.2 g of ethylene oxide, the polymerization was then terminated by the addition of methanol and thereby yielded a polystyrene-polybutadiene-polystyrene triblock copolymer having hydroxyl groups at both ends. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a polystyrene-hydrogenated polybutadiene-polystyrene triblock copolymer having hydroxyl groups at both ends [Mn=200000; hydroxyl group content: 1.7 groups per molecule; proportions of polymer blocks=15/70/15 (by weight); hydrogenation ratio of polybutadiene block=99% by mole] [addition block copolymer ($I_0$-9b)].

Production Example 10

Production of Addition Block Copolymer ($I_0$-10b)

(1) In a pressure-tight case equipped with a stirrer, 2700 g of cyclohexane, 6.4 g of tetrahydrofuran, 308 g of butadiene monomer, and 29 g of dilithio-polybutadiene as a bifunctional initiator were placed and were polymerized at 50° C. for 120 minutes. The resulting mixture was further polymerized with 144 g of styrene monomer at 50° C. for 60 minutes, was subjected to addition with 6 g of ethylene oxide, the polymerization was then terminated by the addition of methanol and thereby yielded a polystyrene-polybutadiene-polystyrene triblock copolymer having hydroxyl groups at both ends. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a polystyrene-hydrogenated polybutadiene-polystyrene triblock copolymer having hydroxyl groups at both ends (hydrogenation ratio of polybutadiene block=94% by mole).

(2) In a pressure-tight case equipped with a stirrer, 1000 g of cyclohexane, 100 g of the above-obtained polystyrene-hydrogenated polybutadiene-polystyrene triblock copolymer having hydroxyl groups at both ends, 5.88 ml of 1.7 mol pentane solution of t-butyllithium, and 1.6 g of N,N,N',N'-tetramethylethylenediamine were placed and were stirred at 50° C. for 120 minutes, the resulting mixture was subjected to addition with 3 g of ethylene oxide, the polymerization was then terminated by the addition of methanol and thereby yielded a polystyrene-hydrogenated polybutadiene-polystyrene triblock copolymer having hydroxyl groups [Mn=60000; hydroxyl group content: 5 groups per molecule; proportions of polymer blocks=15/70/15 (by weight); hydrogenation ratio of polybutadiene block=94% by mole] [addition block copolymer ($I_0$-10b)].

Production Example 11

Production of Addition Block Copolymer ($I_0$-11b)

(1) In a pressure-tight case equipped with a stirrer, 5060 g of cyclohexane, 182 g of styrene monomer, and 34.2 g of a cyclohexane solution (18% by weight) of 3-(t-butyldimethylsiloxy)-2,2-dimethyl-1-propyllithium (available from FMC Corp.) were placed and were polymerized at 40° C. for 60 minutes. The resulting mixture was further polymerized with 850 g of a 60:40 monomer mixture of isoprene and butadiene for 60 minutes, was further polymerized with 182 g of styrene monomer for 60 minutes, and was treated with 10 g of ethylene oxide. The polymerization was then terminated by the addition of methanol and thereby yielded a polystyrene-poly(isoprene/butadiene)-polystyrene triblock copolymer having a hydroxyl group at one of its ends and a protected hydroxyl group at the other. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a hydrogenated triblock copolymer.

(2) The hydrogenated triblock copolymer obtained in (1) above was deprotected in tetrahydrofuran at 60° C. for 7 hours using hydrochloric acid and thereby yielded a polystyrene-hydrogenated poly(isoprene/butadiene)-polystyrene triblock copolymer having hydroxyl groups at both ends [Mn=100000; hydroxyl group content: 1.8 groups per molecule; proportions of polymer blocks=15/70/15 (by weight); hydrogenation ratio of poly(isoprene/butadiene) block=99% by mole] [addition block copolymer ($I_0$-11b)].

Production Example 12

Production of Addition Block Copolymer (12)

In a pressure-tight case equipped with a stirrer, 2700 g of cyclohexane, 71 g of styrene monomer, and 2 ml of 1.3 mol cyclohexane solution of sec-butyllithium were placed and polymerized at 50° C. for 60 minutes. The resulting mixture was further polymerized with 6.27 g of tetrahydrofuran and 265 g of butadiene monomer for 120 minutes, and was further polymerized with 71 g of styrene monomer for 60 minutes. The polymerization was then terminated by the addition of methanol and thereby yielded a polystyrene-polybutadiene-polystyrene triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a polystyrene-hydrogenated polybutadiene-polystyrene triblock copolymer [Mn=260000; proportions of polymer blocks=17.5/65/17.5 (by weight); hydrogenation ratio of polybutadiene block=99% by mole] [addition block copolymer (12)].

Production Example 13

Production of Addition Block Copolymer (13)

In a pressure-tight case equipped with a stirrer, 2700 g of cyclohexane, 71 g of styrene monomer, and 8.2 ml of 1.3 mol cyclohexane solution of sec-butyllithium were placed and polymerized at 50° C. for 60 minutes. The resulting mixture was further polymerized with 6.27 g of tetrahydrofuran and 333 g of butadiene monomer for 120 minutes, and was further polymerized with 71 g of styrene monomer for 60 minutes. The polymerization was then terminated by the addition of methanol and thereby yielded a polystyrene-polybutadiene-polystyrene triblock copolymer. The triblock copolymer was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a polystyrene-hydrogenated polybutadiene-polystyrene triblock copolymer [Mn=60000; proportions of polymer blocks=15/70/15 (by weight); hydrogenation ratio of polybutadiene block=99% by mole] [addition block copolymer (13)].

Production Example 14

Production of Poly(p-methylstyrene)

In a pressure-tight case equipped with a stirrer, 2700 g of cyclohexane, 300 g of p-methylstyrene monomer, and 2.9 ml of a 1.3 mol cyclohexane solution of sec-butyllithium were placed and polymerized at 50° C. for 120 minutes. The polymerization was then terminated by the addition of methanol and thereby yielded a poly(p-methylstyrene) (Mn=60000).

Production Example 15

Production of Polystyrene

In a pressure-tight case equipped with a stirrer, 2700 g of cyclohexane, 300 g of styrene monomer, and 2.9 ml of a 1.3 mol cyclohexane solution of sec-butyllithium were placed and polymerized at 50° C. for 120 minutes. The polymerization was then terminated by the addition of methanol and thereby yielded a polystyrene (Mn=60000).

Production Example 16

Production of Hydrogenated Polybutadiene

In a pressure-tight case equipped with a stirrer, 2700 g of cyclohexane, 6.05 g of tetrahydrofuran, 300 g of butadiene monomer, and 4.35 ml of 1.3 mol cyclohexane solution of sec-butyllithium were placed and polymerized at 50° C. for 120 minutes. The polymerization was then terminated by the addition of methanol and thereby yielded a polybutadiene. The polybutadiene was dissolved in cyclohexane, and the resulting solution was placed in a pressure-tight case, whose atmosphere had been sufficiently replaced with nitrogen gas. The solution was subjected to hydrogenation using a Ni/Al Ziegler hydrogenation catalysis at 80° C. in an atmosphere of hydrogen gas for 5 hours and thereby yielded a hydrogenated polybutadiene [Mn=10000].

Examples 1 to 7

(1) The addition block copolymer ($I_0$-1a) or the addition block copolymer ($I_0$-2a) produced in Production Example 1 or 2, the polyolefin (II-1) or (II-2), the rubber softener (III), the crosslinking agent (IVa-1) or (IVa-2), and a crosslinking accelerator (dibenzothiazyl disulfide) or a coagent (triallyl isocyanurate) were premixed in proportions shown in Table 1 below, the resulting mixtures were fed to a Labo Plastomill [available from Toyo Seiki Seisaku-sho, Ltd.], were melted and kneaded at a temperature of 200° C. and thereby yielded a series of thermoplastic elastomer compositions. The gel fraction of the crosslinked composition obtained according to Example 4 was determined by the method mentioned above, and the result is shown in Table 6 below.

(2) Using the thermoplastic elastomer compositions obtained in (1) above, molded articles (press sheets) 150 mm wide, 150 long and 1 mm thick were produced by molding at a mold temperature of 210° C. using a press molding machine [a single acting compression molding machine "NSF-37" available from Shinto Metal Industries, Ltd.]. The physical properties of the molded articles were determined according to the above-mentioned methods, and the results are shown in Table 1 below.

Examples 8 to 14

(1) The addition block copolymer ($I_0$-1a), ($I_0$-3a) or ($I_0$-4a) produced in Production Example 1, 3 or 4, the polyolefin (II-1) or (II-2), the rubber softener (III), the crosslinking agent (IVa-1), (IVa-2) or (IVa-3), and a crosslinking accelerator (dibenzothiazyl disulfide) or a coagent (triallyl isocyanurate) were premixed in proportions shown in Table 2 below, the resulting mixtures were subjected to the procedure of (1) in Examples 1 to 7 and thereby yielded thermoplastic elastomer compositions.

(2) Using the thermoplastic elastomer compositions obtained in (1) above, molded articles (press sheets) 150 mm wide, 150 long and 1 mm thick were produced by the molding procedure of (2) in Examples 1 to 7. The physical properties of the molded articles were determined according to the above-mentioned methods, and the results are shown in Table 2 below.

Comparative Examples 1 to 6

(1) The addition block copolymer ($I_0$-1a), ($I_0$-2a) or (12) produced in Production Example 1, 2 or 12, the polyolefin (II-1) or (II-2), and the rubber softener (III) were premixed in proportions shown in Table 3 below, the resulting mixtures were subjected to the procedure of (1) in Examples 1 to 7 and thereby yielded thermoplastic elastomer compositions.

(2) Using the thermoplastic elastomer compositions obtained in (1) above, molded articles (press sheets) 150 mm wide, 150 long and 1 mm thick were produced by the molding procedure of (2) in Examples 1 to 7. The physical properties of the molded articles were determined according to the above-mentioned methods, and the results are shown in Table 3 below.

Comparative Examples 7 to 10

(1) The addition block copolymer (12) produced in Production Example 12, the polyolefin (II-1) or (II-2), the rubber softener (III), the crosslinking agent (IVa-1) or (IVa-2), and a crosslinking accelerator (dibenzothiazyl disulfide) or a coagent (triallyl isocyanurate) were premixed in proportions shown in Table 4 below, the resulting mixtures were subjected to the procedure of (1) in Examples 1 to 7 and thereby yielded thermoplastic elastomer compositions. The gel fraction of the crosslinked composition obtained according to Comparative Example 6 was determined by the method mentioned above, and the result is shown in Table 6 below.

(2) Using the thermoplastic elastomer compositions obtained in (1) above, molded articles (press sheets) 150 mm wide, 150 long and 1 mm thick were produced by the molding procedure of (2) in Examples 1 to 7. The physical properties of the molded articles were determined according to the above-mentioned methods, and the results are shown in Table 4 below.

Examples 15 to 21

(1) The addition block copolymer ($I_0$-5a), ($I_0$-6a) or ($I_0$-7a) produced in Production Example 5, 6 or 7, the polyolefin (II-1), (II-2), (II-3), (II-4) or (II-5), the rubber softener (III), the crosslinking agent (IVa-3), and a coagent (triallyl isocyanurate) were premixed in proportions shown in Table 5 below, the resulting mixtures were subjected to the procedure of (1) in Examples 1 to 7 and thereby yielded thermoplastic elastomer compositions.

(2) Using the thermoplastic elastomer compositions obtained in (1) above, molded articles (press sheets) 150 mm wide, 150 long and 1 mm thick were produced by the molding procedure of (2) in Examples 1 to 7. The physical properties of the molded articles were determined according to the above-mentioned methods, and the results are shown in Table 5 below.

Reference Example 1 and Comparative Reference Examples 1 and 2

The addition block copolymer ($I_0$-3a) produced in Production Example 3, the polystyrene produced in Production Example 15 or the hydrogenated polybutadiene produced in Production Example 16, the crosslinking agent (IVa-1), and a crosslinking accelerator (dibenzothiazyl disulfide) were premixed in proportions shown in Table 6 below, the resulting mixtures were subjected to the procedure of (1) in Examples 1 to 7 and thereby yielded samples. The gel fractions of the samples were determined by the method mentioned above, and the results are shown in Table 6 below.

Reference Examples 2 and 3, and Comparative Reference Examples 3 and 4

The poly (p-methylstyrene) produced in Production Example 14, the addition block copolymer ($I_0$-3a) produced in Production Example 3, the polystyrene produced in Production Example 15 or the hydrogenated polybutadiene produced in Production Example 16, the crosslinking agent (IVa-2), and a crosslinking accelerator (triallyl isocyanurate) were premixed in proportions shown in Table 7 below, the resulting mixtures were subjected to the procedure of (1) in Examples 1 to 7 and thereby yielded samples. The gel fractions of the samples were determined by the method mentioned above, and the results are shown in Table 7 below.

TABLE 1

| | Example | | | | | | |
|---|---|---|---|---|---|---|---|
| | 1 | 2 | 3 | 4 | 5 | 6 | 7 |
| [Composition (parts by weight)] | | | | | | | |
| Addition block copolymer ($I_0$-1a) | 100 | 100 | 100 | 100 | 100 | | |
| Addition block copolymer ($I_0$-2a) | | | | | | 100 | 100 |
| Addition block copolymer ($I_0$-3a) | | | | | | | |
| Addition block copolymer ($I_0$-4a) | | | | | | | |
| Addition block copolymer (12) | | | | | | | |
| Polyolefin (II-1) | 15 | 15 | 30 | | | 15 | 15 |
| Polyolefin (II-2) | | | | 30 | 30 | | |
| Rubber softener (III) | 200 | 200 | 100 | 100 | 100 | 200 | 200 |
| Crosslinking Agent (IVa-1) | 2 | | 2 | 2 | | 2 | |
| Crosslinking Agent (IVa-2) | | 4.5 | | | 4.5 | | 4.5 |
| Crosslinking Agent (IVa-3) | | | | | | | |
| Dibenzothiazyl disulfide | 1.6 | | 1.6 | 1.6 | | 1.6 | |
| Triallyl isocyanurate | | 9 | | | 9 | | 9 |
| [Physical Properties] | | | | | | | |
| Tensile strength at break (MPa) | 2.8 | 0.6 | 5.7 | 6.0 | 1.6 | 2.7 | 1.2 |
| Tensile elongation at break (%) | 690 | 350 | 680 | 720 | 340 | 730 | 320 |
| Rubber hardness (JIS A) | 20 | 18 | 56 | 54 | 54 | 19 | 18 |
| Compression set (%) at 120° C. | 16 | 14 | 24 | 25 | 37 | 17 | 18 |

TABLE 2

|  | Example | | | | | | |
|---|---|---|---|---|---|---|---|
|  | 8 | 9 | 10 | 11 | 12 | 13 | 14 |
| [Composition (parts by weight)] | | | | | | | |
| Addition block copolymer ($I_0$-1a) | 100 | 100 |  |  |  | 100 | 100 |
| Addition block copolymer ($I_0$-2a) |  |  |  |  | 100 |  |  |
| Addition block copolymer ($I_0$-3a) |  |  |  |  |  |  |  |
| Addition block copolymer ($I_0$-4a) |  |  | 100 | 100 |  |  |  |
| Addition block copolymer (12) |  |  |  |  |  |  |  |
| Polyolefin (II-1) |  |  |  |  |  | 15 |  |
| Polyolefin (II-2) | 30 | 30 | 30 | 30 | 20 |  | 30 |
| Rubber softener (III) | 100 | 100 | 100 | 100 | 200 |  | 100 |
| Crosslinking Agent (IVa-1) | 2 |  | 2 |  | 2 |  |  |
| Crosslinking Agent (IVa-2) |  | 4.5 |  | 4.5 |  |  |  |
| Crosslinking Agent (IVa-3) |  |  |  |  |  | 6 | 6 |
| Dibenzothiazyl disulfide | 1.6 |  | 1.6 |  | 1.6 |  |  |
| Triallyl isocyanurate |  | 9 |  | 9 | 9 | 12 | 12 |
| [Physical Properties] | | | | | | | |
| Tensile strength at break (MPa) | 5.3 | 4.0 | 6.8 | 2.5 | 12.0 | 5.4 | 1.3 |
| Tensile elongation at break (%) | 600 | 320 | 650 | 300 | 740 | 280 | 330 |
| Rubber hardness (JIS A) | 58 | 57 | 59 | 60 | 86 | 59 | 24 |
| Compression set (%) at 120° C. | 25 | 40 | 26 | 32 | 35 | 26 | 16 |

TABLE 3

|  | Comparative Example | | | | | |
|---|---|---|---|---|---|---|
|  | 1 | 2 | 3 | 4 | 5 | 6 |
| [Composition (parts by weight)] | | | | | | |
| Addition block copolymer ($I_0$-1a) | 100 | 100 |  |  |  |  |
| Addition block copolymer ($I_0$-2a) |  |  | 100 | 100 |  |  |
| Addition block copolymer ($I_0$-3a) |  |  |  |  |  |  |
| Addition block copolymer ($I_0$-4a) |  |  |  |  |  |  |
| Addition block copolymer (12) |  |  |  |  | 100 | 100 |
| Polyolefin (II-1) | 15 |  | 30 |  | 15 |  |
| Polyolefin (II-2) |  | 30 |  | 30 |  | 30 |
| Rubber softener (III) | 200 | 100 | 200 | 100 | 200 | 100 |
| Crosslinking Agent (IVa-1) |  |  |  |  |  |  |
| Crosslinking Agent (IVa-2) |  |  |  |  |  |  |
| Crosslinking Agent (IVa-3) |  |  |  |  |  |  |
| Dibenzothiazyl disulfide |  |  |  |  |  |  |
| Triallyl isocyanurate |  |  |  |  |  |  |
| [Physical Properties] | | | | | | |
| Tensile strength at break (MPa) | 3.3 | 6.8 | 3.2 | 9.3 | 3.5 | 11.5 |
| Tensile elongation at break (%) | 960 | 980 | 980 | 900 | 980 | 830 |
| Rubber hardness (JIS A) | 11 | 44 | 12 | 47 | 13 | 54 |
| Compression set (%) at 120° C. | 80 | 83 | 64 | 62 | 64 | 64 |

TABLE 4

|  | Comparative Example | | | |
|---|---|---|---|---|
|  | 7 | 8 | 9 | 10 |
| [Composition (parts by weight)] | | | | |
| Addition block copolymer ($I_0$-1a) |  |  |  |  |
| Addition block copolymer ($I_0$-2a) |  |  |  |  |
| Addition block copolymer ($I_0$-3a) |  |  |  |  |
| Addition block copolymer ($I_0$-4a) |  |  |  |  |
| Addition block copolymer (12) | 100 | 100 | 100 | 100 |
| Polyolefin (II-1) | 15 |  | 15 | 30 |
| Polyolefin (II-2) |  | 30 |  |  |
| Rubber softener (III) | 200 | 100 | 200 | 100 |
| Crosslinking Agent (IVa-1) | 2 | 2 |  |  |
| Crosslinking Agent (IVa-2) |  |  | 4.5 | 4.5 |
| Crosslinking Agent (IVa-3) |  |  |  |  |
| Dibenzothiazyl disulfide | 1.6 | 1.6 |  |  |
| Triallyl isocyanurate |  |  | 9 | 9 |
| [Physical Properties] | | | | |
| Tensile strength at break (MPa) | 3.4 | 13.4 | 1.5 | 4.3 |
| Tensile elongation at break (%) | 950 | 850 | 540 | 350 |
| Rubber hardness (JIS A) | 14 | 54 | 17 | 55 |
| Compression set (%) at 120° C. | 58 | 55 | 43 | 44 |

TABLE 5

|  | Example | | | | | | |
|---|---|---|---|---|---|---|---|
|  | 15 | 16 | 17 | 18 | 19 | 20 | 21 |
| [Composition (parts by weight)] | | | | | | | |
| Addition block copolymer ($I_0$-5a) | 100 | 100 | 100 | 100 | 100 |  |  |
| Addition block copolymer ($I_0$-6a) |  |  |  |  |  | 100 |  |
| Addition block copolymer ($I_0$-7a) |  |  |  |  |  |  | 100 |
| Polyolefin (II-2) |  |  |  |  |  | 30 | 30 |
| Polyolefin (II-3) | 30 |  |  |  |  |  |  |
| Polyolefin (II-4) |  | 30 |  |  |  |  |  |
| Polyolefin (II-5) |  |  | 30 | 50 | 15 |  |  |
| Rubber softener (III) | 100 | 100 | 100 | 100 | 200 | 100 | 100 |
| Crosslinking Agent (IVa-3) | 6 | 6 | 6 | 6 | 6 | 6 | 6 |
| Triallyl isocyanurate | 12 | 12 | 12 | 12 | 12 | 12 | 12 |
| [Physical Properties] | | | | | | | |
| Tensile strength at break (MPa) | 6.0 | 6.5 | 6.3 | 9.3 | 1.7 | 5.9 | 5.4 |
| Tensile elongation at break (%) | 260 | 350 | 330 | 400 | 350 | 300 | 260 |

TABLE 5-continued

| | Example | | | | | | |
|---|---|---|---|---|---|---|---|
| | 15 | 16 | 17 | 18 | 19 | 20 | 21 |
| Rubber hardness (JIS A) | 62 | 60 | 60 | 76 | 26 | 60 | 57 |
| Compression set (%) at 120° C. | 27 | 23 | 24 | 40 | 18 | 28 | 24 |

TABLE 6

| | Ref. Ex. 1 | Com. Ref. Ex. 1 | Com. Ref. Ex. 2 | Ex. 4 | Com. Ex. 8 |
|---|---|---|---|---|---|
| [Composition (parts by weight) | | | | | |
| Addition block copolymer ($I_0$-1a) | | | | 100 | |
| Addition block copolymer ($I_0$-3a) | 100 | | | | |
| Addition block copolymer (12) | | | | | 100 |
| Poly(p-methylstyrene) | | | | | |
| Polystyrene | | 100 | | | |
| Hydrogenated polybutadiene | | | 100 | | |
| Polyolefin (II-2) | | | | 30 | 30 |
| Rubber softener (III) | | | | 100 | 100 |
| Crosslinking agent (IVa-1) | 2 | 2 | 2 | 2 | 2 |
| Crosslinking agent (IVa-2) | | | | | |
| Dibenzothiazyl disulfide | 1.6 | 1.6 | 1.6 | 1.6 | 1.6 |
| Triallyl isocyanurate | | | | | |
| Gel fraction after crosslinking (weight %) | 85 | 0 | 10 | 90 | 8 |

TABLE 7

| | Ref. Ex. 2 | Ref. Ex. 3 | Com. Ref. Ex. 3 | Com. Ref. Ex. 4 |
|---|---|---|---|---|
| [Composition (parts by weight) | | | | |
| Addition block copolymer ($I_0$-1a) | | | | |
| Addition block copolymer ($I_0$-3a) | | 100 | | |
| Addition block copolymer (12) | | | | |
| Poly(p-methylstyrene) | 100 | | | |
| Polystyrene | | | 100 | |
| Hydrogenated polybutadiene | | | | 100 |
| Polyolefin (II-2) | | | | |
| Rubber softener (III) | | | | |
| Crosslinking agent (IVa-1) | | | | |
| Crosslinking agent (IVa-2) | 4.5 | 4.5 | 4.5 | 4.5 |
| Dibenzothiazyl disulfide | | | | |
| Triallyl isocyanurate | 9 | 9 | 9 | 9 |
| Gel fraction after Crosslinking (weight %) | 98 | 96 | 0 | 97 |

The results in Tables 1 to 5 show that the thermoplastic elastomer compositions obtained according to Examples 1 to 21 exhibit a low compression set at 120° C. and excellent strain recovery at high temperatures, since these thermoplastic elastomer compositions are obtained by dynamic vulcanization of a mixture under melting conditions, which mixture comprises any one of the addition block copolymers ($I_0$-1a), ($I_0$-2a), ($I_0$-3a), ($I_0$-4a), ($I_0$-5a), ($I_0$-6a), and ($I_0$-7a), in which at least one of the polymer block(s) (A) comprises aromatic vinyl compound units having a ($C_1$–$C_8$ alkyl) styrene-derived structural unit in a content of 1% by weight or more based on the total weight of the polymer block (A) constituting the block copolymer, and the mixture further comprises the polyolefin (II), the rubber softener (III), and the crosslinking agent (IV) [crosslinking agent (IVa-1), (IVa-2), or (IVa-3)] in proportions specified in the present invention.

In contrast, the uncrosslinked thermoplastic elastomer compositions obtained in Comparative Examples 1 to 6, and the thermoplastic elastomer compositions obtained in Comparative Examples 7 to 10 in which a polymer block (A) (a hard segment comprising aromatic vinyl compound units) in the addition block copolymer has not been crosslinked have a higher compression set at 120° C. and lower strain recovery at high temperatures than the thermoplastic elastomer compositions obtained in Examples 1 to 21.

The results in Tables 6 and 7 can be summarized as follows.

(i) Comparative Reference Examples 1 and 3 using the polystyrene, Comparative Reference Example 2 using the hydrogenated polybutadiene, and Comparative Example 8 using the addition block copolymer (12) comprising the polystyrene block and the hydrogenated polybutadiene have zero or a very low gel fraction and are not crosslinked or little crosslinked after dynamic treatment under melting conditions (melting and kneading) with the crosslinking agent (IVa-1) (bismaleimide compound). These compositions do not have a ($C_1$–$C_8$ alkyl)styrene-derived structural unit (a) (methylstyrene-derived structural unit).

(ii) The sample of Reference Example 2 obtained by melt kneading of the poly(p-methylstyrene) with the crosslinking agent (IVa-2) (organic peroxide) and the sample of Comparative Reference Example 4 obtained by melt kneading of the hydrogenated polybutadiene with the crosslinking agent (IVa-2) (organic peroxide) each have a high gel fraction. These results show that the poly(p-methylstyrene) having a ($C_1$–$C_8$ alkyl)styrene-derived structural unit (methylstyrene-derived structural unit) and the hydrogenated polybutadiene are crosslinked through an organic peroxide.

(iii) In contrast, the samples of Reference Example 1 using the addition block copolymer ($I_0$-3a) and of Example 4 using the addition block copolymer ($I_0$-1a) each have a very high gel fraction as a result of dynamic treatment under melting conditions with the crosslinking agent (IVa-1) (bismaleimide compound). Each of these addition block copolymers has a ($C_1$–$C_8$ alkyl)styrene-derived structural unit (methylstyrene-derived unit).

(iv) The sample of Reference Example 3 using the addition block copolymer ($I_0$-3a) having a ($C_1$–$C_8$ alkyl)styrene-derived structural unit (methylstyrene-derived unit) has a very high gel fraction as a result of dynamic treatment under melting conditions with the crosslinking agent (IVa-2) (organic peroxide).

The results (i), (ii), (iii) and (iv) verify that an addition block copolymer ($I_0$) having a ($C_1$–$C_8$ alkyl)styrene-derived structural unit in its polymer block (A) is crosslinked at least in the polymer block (A) (($C_1$–$C_8$ alkyl)styrene-derived structural unit moiety) by dynamic vulcanization under melting conditions using the cross linking agent (IVa-1) (bismaleimide compound) or the crosslinking agent (IVa-2) (organic peroxide), and that a block copolymer comprising a polymer block (A) having an alkylstyrene-derived unit and a polymer block (B) is crosslinked both in the polymer block (A) and the polymer block (B) by dynamic vulcanization under melting conditions using the organic peroxide as the crosslinking agent.

Examples 22 to 28

(1) The addition block copolymer ($I_0$-8b), ($I_0$-9b), ($I_0$-10b) or ($I_0$-11b) produced in Production Example 8, 9, 10, or 11, the polyolefin (II-1) or (II-2), the rubber softener (III), and the crosslinking agent (IVb-4) or (IVb-5) were premixed in proportions shown in Table 8 below, the resulting mixtures were fed to a Labo Plastomill [available from Toyo Seiki Seisaku-sho, Ltd.], were melted and kneaded at a temperature of 180° C. and thereby yielded a series of thermoplastic elastomer compositions. The gel fraction of the crosslinked composition obtained according to Example 22 was determined by the method mentioned above, and the result is shown in Table 10 below.

(2) Using the thermoplastic elastomer compositions obtained in (1) above, molded articles (press sheets) 150 mm wide, 150 long and 1 mm thick were produced by molding at a mold temperature of 210° C. using a press molding machine [a single acting compression molding machine "NSF-37" available from Shinto Metal Industries, Ltd.]. The physical properties of the molded articles were determined according to the above-mentioned methods, and the results are shown in Table 8 below.

Comparative Examples 11 to 17

(1) The addition block copolymer ($I_0$-8b), ($I_0$-9b), ($I_0$-10b) or ($I_0$-11b) produced in Production Example 8, 9, 10 or 11, the polyolefin (II-1) or (II-2), and the rubber softener (III) were mixed in proportions shown in Table 9 below, the resulting mixtures were further mixed with the crosslinking agent (IVa-2) (dicumyl peroxide) and a coagent (triallyl isocyanurate) in proportions shown in Table 9. The resulting mixtures were subjected to the procedure of (1) in Examples 22 to 28 and thereby yielded a series of thermoplastic elastomer compositions.

(2) Using the thermoplastic elastomer compositions obtained in (1) above, molded articles (press sheets) 150 mm wide, 150 long and 1 mm thick were produced by the molding procedure of (2) in Examples 22 to 28. The physical properties of the molded articles were determined according to the above-mentioned methods, and the results are shown in Table 9 below.

Comparative Reference Example 5

The addition block copolymer (13) having neither ($C_1$–$C_8$ alkyl)styrene-derived structural unit (a) nor functional group (b) produced in Production Example 13, the polyolefin (II-1), the rubber softener (III), and the crosslinking agent (IVb-4) (polyisocyanate) were premixed in proportions shown in Table 10 below, the resulting mixture was subjected to the procedure of (1) in Examples 22 to 27 and thereby yielded a sample. The gel fraction of the sample was determined by the method mentioned above, and the result is shown in Table 10 below.

Reference Example 4 and Comparative Reference Example 6

The addition block copolymer ($I_0$-8b) produced in Production Example 8 or the addition block copolymer (13) having neither ($C_1$–$C_8$ alkyl)styrene-derived structural unit (a) nor functional group (b) and being produced in Production Example 13, and the crosslinking agent (IVb-4) (polyisocyanate) were premixed in proportions shown in Table 10 below, the resulting mixtures were subjected to the procedure of (1) in Examples 22 to 27 and thereby yielded samples. The gel fractions of the samples were determined by the method mentioned above, and the results are shown in Table 10 below.

Comparative Reference Example 7

The addition block copolymer (13) having neither ($C_1$–$C_8$ alkyl)styrene-derived structural unit (a) nor functional group (b) and being produced in Production Example 13 and the rubber softener (III) were premixed in proportions shown in Table 10 below, the resulting mixture was subjected to the procedure of (1) in Examples 22 to 28 and thereby yielded a sample. The gel fraction of the sample was determined by the method mentioned above, and the result is shown in Table 10 below.

Using the thermoplastic elastomer composition obtained in the above, a molded article (press sheet) 150 mm wide, 150 long and 1 mm thick was produced by the molding procedure of (2) in Examples 22 to 28. The dynamic viscoelasticity of a specimen obtained from the press sheet was determined according to the aforementioned method, and the result is shown in a graph in FIG. 1.

Reference Example 5

The addition block copolymer ($I_0$-8b) produced in Production Example 8, the rubber softener (III), and the crosslinking agent (IVb-4) (polyisocyanate) were premixed in proportions shown in Table 10 below, the resulting mixture was subjected to the procedure of (1) in Examples 22 to 28 and thereby yielded a pelletized sample. The gel fraction of the sample was determined by the method mentioned above, and the result is shown in Table 10 below.

Using the thermoplastic elastomer composition obtained in the above, a molded article (press sheet) 150 mm wide, 150 long and 1 mm thick was produced by the molding procedure of (2) in Examples 22 to 28. The dynamic viscoelasticity of a specimen obtained from the press sheet was determined according to the aforementioned method, and the result is shown in a graph in FIG. 1.

TABLE 8

| | Example | | | | | | |
|---|---|---|---|---|---|---|---|
| | 22 | 23 | 24 | 25 | 26 | 27 | 28 |
| [Composition (parts by weight)] | | | | | | | |
| Addition block copolymer ($I_0$-8b) | 100 | 100 | | | | | |
| Addition block copolymer ($I_0$-9b) | | | 100 | 100 | | | |
| Addition block copolymer ($I_0$-10b) | | | | | 100 | 100 | |
| Addition block copolymer ($I_0$-11b) | | | | | | | 100 |
| Polyolefin (II-1) | 33 | 30 | 15 | | 33 | 33 | |
| Polyolefin (II-2) | | | | 30 | | | 30 |
| Rubber softener (III) | 50 | | 200 | 100 | 50 | 50 | 100 |
| Crosslinking Agent (IVb-4) (polyisocyanate) | 0.3 | 0.2 | 1.4 | 0.7 | 0.6 | | 1.0 |
| Crosslinking Agent (IVb-5) | | | | | | 0.2 | |

TABLE 8-continued

|  | Example | | | | | | |
|---|---|---|---|---|---|---|---|
|  | 22 | 23 | 24 | 25 | 26 | 27 | 28 |
| (pyromellitic anhydride) | | | | | | | |
| [Physical Properties] | | | | | | | |
| Tensile strength at break (MPa) | 7.3 | 8.5 | 1.7 | 6.3 | 8.2 | 8.0 | 4.8 |
| Tensile elongation at break (%) | 720 | 700 | 650 | 780 | 550 | 580 | 450 |
| Rubber hardness (JIS A) | 82 | 85 | 22 | 53 | 80 | 80 | 48 |
| Compression set (%) at 120° C. | 33 | 37 | 23 | 30 | 35 | 36 | 38 |

TABLE 9

|  | Comparative Example | | | | | | |
|---|---|---|---|---|---|---|---|
|  | 11 | 12 | 13 | 14 | 15 | 16 | 17 |
| [Composition] | | | | | | | |
| Addition block copolymer ($I_0$-8b) | 100 | 100 | | | | | |
| Addition block copolymer ($I_0$-9b) | | | 100 | 100 | 100 | 100 | |
| Addition block copolymer ($I_0$-10b) | | | | | | | 100 |
| Polyolefin (II-1) | 33 | 33 | 15 | 15 | | | 33 |
| Polyolefin (II-2) | | | | | 30 | 30 | |
| Rubber softener (III) | 50 | 50 | 200 | 200 | 100 | 100 | 50 |
| Crosslinking Agent (IVa-2) (organic peroxide) | | 3 | | 3 | | 3 | |
| Coagent (triallyl isocyanurate) | | 6 | | 6 | | 6 | |
| [Physical Properties] | | | | | | | |
| Tensile strength at break (MPa) | 7.8 | 5.8 | 2.3 | 1.8 | 7.3 | 6.4 | 8.6 |
| Tensile elongation at break (%) | 800 | 350 | 950 | 550 | 900 | 400 | 75 |
| Rubber hardness (JIS A) | 79 | 84 | 18 | 26 | 47 | 58 | 77 |
| Compression set (%) at 120° C. | 100 | 75 | 65 | 40 | 73 | 42 | 100 |

The results in Tables 8 and 9 show that the thermoplastic elastomer compositions obtained in Examples 22 to 28 each exhibit a low compression set at 120° C. and excellent strain recovery at high temperatures, since these thermoplastic elastomer compositions are obtained by dynamic vulcanization of a mixture under melting conditions, which mixture comprises any one of the addition block copolymers ($I_0$-8b), ($I_0$-9b), ($I_0$-10b), and ($I_0$-11b) having a functional group in a polymer block (A), and further comprises the polyolefin (II-1) or (II-2), the rubber softener (III), and the crosslinking agent (IVb-4) or (IVb-5) that can react with the functional group (b) in proportions specified in the present invention.

In contrast, the thermoplastic elastomer compositions obtained in Comparative Examples 11, 13, 15 and 17 each have a higher compression set at 120° C. and lower strain recovery at high temperatures. Because these thermoplastic elastomer compositions comprise no crosslinking agent although they comprise any of the addition block copolymer ($I_0$-8b), ($I_0$-9b) and ($I_0$-10b) each having a functional group in the polymer block (A) and being obtained in Production Examples 8, 9, and 10, with the polyolefin (II-1) or (II-2) and the rubber softener (III).

The thermoplastic elastomer compositions obtained in Comparative Examples 12, 14 and 16 each have a higher compression set at 120° C. and lower strain recovery at high temperatures than the thermoplastic elastomer compositions of Examples 22 to 28. The thermoplastic elastomer compositions in question use the crosslinking agent (IVa-2) (organic peroxide) that cannot crosslink the functional group (hydroxyl group) of the polymer block (A), although they comprise any of the addition block copolymer ($I_0$-8b), ($I_0$-9b) and ($I_0$-10b) each having a functional group in the polymer block (A) and being obtained in Production Examples 8, 9, and 10, with the polyolefin (II-1) or (II-2), the rubber softener (III), and the crosslinking agent.

Table 10 shows that the compositions obtained in Comparative Reference Examples 5 and 6 using the addition block copolymer (13) having neither ($C_1$–$C_8$ alkyl)styrene-derived structural unit (a) nor functional group (b) have a gel fraction of zero and are not crosslinked, although they are dynamically treated under melting conditions using the crosslinking agent (IVb-4) (polyisocyanate), and that the composition obtained in Comparative Reference Example 7 has a gel fraction of zero and is not crosslinked, since the composition uses the addition block copolymer (13) having neither ($C_1$–$C_8$ alkyl)styrene-derived structural unit (a) nor

TABLE 10

|  | Ex. 22 | Com. Ref. Ex. 5 | Ref. Ex. 4 | Com. Ref. Ex. 6 | Ref. Ex. 5 | Com. Ref. Ex. 7 |
|---|---|---|---|---|---|---|
| [Composition (parts by weight)] | | | | | | |
| Addition block copolymer ($I_0$-8b) | 100 | | 100 | | 100 | |
| Addition block copolymer (13) | | 100 | | 100 | | 100 |
| Polyolefin (II-1) | 33 | 33 | | | | |
| Polyolefin (II-2) | | | | | | |
| Rubber softener (III) | 50 | 50 | | | 50 | 50 |
| Crosslinking agent (IVb-4) (polyisocyanate) | 0.3 | 0.3 | 0.3 | 0.3 | 2 | |
| Gel fraction after crosslinking (weight %) | 84 | 0 | 85 | 0 | 83 | 0 | functional group (b) and is melted and kneaded with the rubber softener (III) alone without the use of a crosslinking agent.

In contrast, the compositions obtained in Example 22, Reference Examples 4 and 5 each have a high gel fraction, since they are obtained by adding the crosslinking agent (IVb-4) (polyisocyanate) to the addition block copolymer ($I_0$-8b) having a hydroxyl group in the polymer block (A) and kneading the resulting mixture under melting conditions.

These results show that an addition block copolymer ($I_0$) having a functional group in its polymer block (A) can be crosslinked in the polymer block (A) constituting a hard segment by dynamic heating under melting conditions with the addition of a crosslinking agent that reacts with the functional group.

The graph in FIG. 1 shows that the thermoplastic elastomer composition obtained in Comparative Reference Example 7 is not crosslinked and there by has a significantly decreased storage modulus at temperatures of 80° C. or higher, and that thermoplastic elastomer composition obtained in Reference Example 5 is crosslinked in the polymer block (A) constituting a hard segment of the addition block copolymer (I) and thereby exhibits trivial decrease in storage modulus even at high temperatures of 80° C. or higher and can keep its high modulus.

INDUSTRIAL APPLICABILITY

The thermoplastic elastomer compositions of the present invention have excellent strain recovery and satisfactory moldability, are flexible, and have satisfactory rubber properties. They are very effectively useable in automobile parts, civil engineering and construction applications, home-appliance parts, sporting goods, sundry goods, stationery, other various molded articles, and other wide-ranging applications.

The thermoplastic elastomer compositions of the present invention can be very easily and smoothly produced by the method of the present invention, which method comprises the steps of mixing an addition block copolymer ($I_0$) and/or a hydrogenated product thereof with a polyolefin (II) and where necessary a rubber softener (III) in specific proportions, mixing the mixture with a crosslinking agent (IV), and subjecting the resulting mixture to dynamic vulcanization under melting conditions, which addition block copolymer ($I_0$) comprises at least one polymer block (A) having aromatic vinyl compound units and at least one polymer block (B) having conjugated diene compound units and has at least one of a ($C_1$–$C_8$ alkyl)styrene-derived structural unit (a) and a functional group (b) in the polymer block (A).

The invention claimed is:

1. A thermoplastic elastomer composition comprising:
   100 parts by weight of at least one addition block copolymer (I) selected from among block copolymers and hydrogenated products thereof,
   wherein the block copolymers comprise
   at least one hard segment polymer block (A) comprising alkylstyrene-derived functional units or aromatic vinyl compound units having a functional group (b),
   wherein the functional group (b) is at least one functional group selected from functional groups having active hydrogen atoms selected from the group consisting of —OH, —SH, —NH$_2$, —NHR, —CONH$_2$, —CONH, —SO$_3$H, —SO$_2$H, and —SOH; functional groups having nitrogen atoms; functional groups having carbonyl groups; functional groups having thiocarbonyl groups; epoxy groups; and thioepoxy groups in the polymer block (A) of the addition block copolymer (I), and
   at least one polymer block (B) comprising conjugated diene compound units, and the addition block copolymers being crosslinked at least in the polymer block (A);
   wherein the block copolymers are crosslinked at least in the polymer block (A) and a crosslinked unit between the polymer block (A) comprises the alkylstyrene-derived functional units or the functional group (b);
   10 to 300 parts by weight of a polyolefin (II); and
   0 to 300 parts by weight of a rubber softener (III).

2. The thermoplastic elastomer composition according to claim 1, wherein the addition block copolymer (I) has at least one of an alkylstyrene-derived structural unit (a) and a functional group (b) in the polymer block (A), which alkylstyrene-derived structural unit (a) has at least one alkyl group containing from 1 to 8 carbon atoms, and wherein the addition block copolymer (I) is crosslinked at least in the polymer block (A) through the at least one of the alkylstyrene-derived structural unit (a) and the functional group (b).

3. The thermoplastic elastomer composition according to claim 1, wherein the addition block copolymer (I) has an alkylstyrene-derived structural unit (a) in the polymer block (A) in an amount of to by weight or more based on the total weight of the polymer block (A), which alkylstyrene-derived structural unit (a) has at least one alkyl group containing from 1 to 8 carbon atoms, and wherein the addition block copolymer (I) is crosslinked at least in the polymer block (A) through the alkylstyrene-derived structural unit (a).

4. The thermoplastic elastomer composition according to claim 1, wherein the addition block copolymer (I) has a functional group (b) in the polymer block (A) in an amount of 1.5 groups or more per molecule of the addition block copolymer (I), and wherein the addition block copolymer (I) is crosslinked at least in the polymer block (A) through the functional group (b).

5. The thermoplastic elastomer composition according to claim 1, wherein the alkylstyrene-derived structural unit (a) is a p-methyl styrene, and the functional group (b) is a hydroxyl group.

6. The thermoplastic elastomer composition according to claim 1, wherein the thermoplastic elastomer composition has a morphological structure in which at least the polyolefin (II) constitutes a continuous phase.

7. A process for producing the thermoplastic elastomer composition of claim 1, the process comprising the step of dynamic vulcanization of a mixture under melting conditions, the mixture comprising:
   100 parts by weight of at least one addition block copolymer ($I_0$) selected from among block copolymers and hydrogenated products thereof, the block copolymers each having at least one polymer block (A) comprising aromatic vinyl compound units; and at least one polymer block (B) comprising conjugated diene compound units, the polymer block (A) having at least one of an alkylstyrene-derived structural unit (a) and a functional group (b), the alkylstyrene-derived structural unit (a) having at least one alkyl group containing from 1 to 8 carbon atoms;
   10 to 300 parts by weight of a polyolefin (II);
   0 to 300 parts by weight of a rubber softener (III); and
   0.01 to 20 parts by weight of a crosslinking agent (IV).

8. The process for producing the thermoplastic elastomer composition according to claim 7, wherein the addition block copolymer ($I_0$) comprises the alkylstyrene-derived structural unit (a) in the polymer block (A) in an amount of to by weight or more based on the total weight of the polymer block (A), which alkylstyrene-derived structural unit (a) has at least one alkyl group containing from 1 to 8 carbon atoms.

9. The process for producing the thermoplastic elastomer composition according to claim 8, wherein the crosslinking agent (IV) is at least one compound selected from bismaleimide compounds and organic peroxides.

10. The process for producing the thermoplastic elastomer composition according to claim 7, wherein the addition block copolymer ($I_0$) comprises the functional group (b) in the polymer block (A) in an amount of 1.5 groups or more per molecule of the addition block copolymer (I).

11. The process for producing the thermoplastic elastomer composition according to claim 7, wherein the alkylstyrene-derived structural unit (a) is a p-alkylstyrene unit containing from 1 to 8 carbon atoms in its alkyl group, and the functional group (b) is at least one functional group selected from functional groups having active hydrogen atoms, functional groups having nitrogen atoms, functional groups having carbonyl groups, functional groups having thiocarbonyl groups, epoxy groups, and thioepoxy groups in the polymer block (A) of the addition block copolymer ($I_0$).

12. The process for producing the thermoplastic elastomer composition according to claim 7, wherein the alkylstyrene-derived structural unit (b) is a p-methylstyrene unit, and the functional group (b) is a hydroxyl group in the polymer block (A) of the addition block copolymer ($I_0$).

13. A molded article comprising the thermoplastic elastomer composition of claim 1.

* * * * *